(12) United States Patent
Yoshizawa et al.

(10) Patent No.: US 12,342,247 B2
(45) Date of Patent: Jun. 24, 2025

(54) METHOD AND DEVICE FOR REDUCING SECURITY RISK IN COMMUNICATION

(71) Applicant: NEC Corporation, Tokyo (JP)

(72) Inventors: Takahito Yoshizawa, Boom (BE); Nivedya Parambath Sasi, Bengaluru (IN); Rohini Rajendran, Bengaluru (IN)

(73) Assignee: NEC CORPORATION, Tokyo (JP)

( * ) Notice: Subject to any disclaimer, the term of this patent is extended or adjusted under 35 U.S.C. 154(b) by 317 days.

(21) Appl. No.: 17/629,595

(22) PCT Filed: Aug. 13, 2020

(86) PCT No.: PCT/JP2020/030749
§ 371 (c)(1),
(2) Date: Jan. 24, 2022

(87) PCT Pub. No.: WO2021/033615
PCT Pub. Date: Feb. 25, 2021

(65) Prior Publication Data
US 2022/0286820 A1 Sep. 8, 2022

(30) Foreign Application Priority Data

Aug. 16, 2019 (IN) .............................. 201911033136
Oct. 23, 2019 (IN) .............................. 201911043095

(51) Int. Cl.
*H04W 4/12* (2009.01)
*H04W 4/40* (2018.01)
(Continued)

(52) U.S. Cl.
CPC .............. *H04W 4/12* (2013.01); *H04W 4/40* (2018.02); *H04W 12/02* (2013.01); *H04W 92/18* (2013.01)

(58) Field of Classification Search
CPC .......... H04W 4/12; H04W 4/40; H04W 12/02; H04W 92/18; H04W 8/16; H04W 76/14;
(Continued)

(56) References Cited

U.S. PATENT DOCUMENTS

2004/0103282 A1* 5/2004 Meier .................... H04L 9/0891
713/171
2005/0063324 A1* 3/2005 O'Neill ............... H04L 63/0892
370/310
(Continued)

FOREIGN PATENT DOCUMENTS

JP 2014-082790 A 5/2014
JP 2014-183395 A 9/2014
(Continued)

OTHER PUBLICATIONS

"3rd generation partnership project: Technical specification group services and system (5GS) to support vehicle-to-everything (V2X) services (Release 16)" (Year: 2019).*
(Continued)

*Primary Examiner* — Mewale A Ambaye
(74) *Attorney, Agent, or Firm* — Sughrue Mion, PLLC

(57) ABSTRACT

A communication system, a UE (User Equipment), a communication method and a computer readable medium may be provided. The communication system (100) includes: a first UE (User Equipment) (110) including a first controller and a first transceiver, wherein the first controller is configured to control the transceiver to send a message including L2 ID (Layer 2 Identity) and verification information; and a second UE (120) including a second controller and a second transceiver, wherein the second controller is configured: to control the transceiver to receive the message from the first UE (110); and to determine whether to accept the L2 ID or not using the verification information.

10 Claims, 17 Drawing Sheets

(51) Int. Cl.
*H04W 12/02* (2009.01)
*H04W 92/18* (2009.01)

(58) Field of Classification Search
CPC ....... H04W 76/23; H04W 12/75; H04W 4/06; H04L 63/62
See application file for complete search history.

(56) References Cited

U.S. PATENT DOCUMENTS

| | | | | |
|---|---|---|---|---|
| 2005/0243830 | A1* | 11/2005 | Wrenn | H04L 45/247 370/394 |
| 2006/0031519 | A1* | 2/2006 | Helliwell | H04L 67/2876 709/227 |
| 2007/0120705 | A1* | 5/2007 | Kiiskila | G01D 4/002 340/870.02 |
| 2007/0242637 | A1* | 10/2007 | Dynarski | H04L 12/66 370/331 |
| 2008/0051036 | A1* | 2/2008 | Vaswani | H04W 40/28 455/69 |
| 2009/0016334 | A1* | 1/2009 | Forsberg | H04W 28/06 370/469 |
| 2013/0339498 | A1* | 12/2013 | Johnson | H04L 67/104 709/221 |
| 2017/0099282 | A1* | 4/2017 | Craddock | G06F 3/0622 |
| 2022/0035621 | A1* | 2/2022 | Nagano | G06F 8/65 |

FOREIGN PATENT DOCUMENTS

| | | | |
|---|---|---|---|
| JP | 5770602 | B2 | 8/2015 |
| JP | 2016-021700 | A | 2/2016 |
| JP | 2017-021219 | A | 1/2017 |
| JP | 2017-092634 | A | 5/2017 |
| JP | 2020-533913 | A | 11/2020 |

OTHER PUBLICATIONS

"3rd generation partnership project: Technical specification group services and system (5GS) to support vehicle-to-everything (V2X) services (Release 16)" (Year: 2018).*
JP Office Action for JP Application No. 2022-504006, mailed on Dec. 27, 2022 with English Translation.
JP Office Action for JP Application No. 2022-504006, mailed on Aug. 15, 2023 with English Translation.
Interdigital, "TS 23.287 Unicast for V2X communication over PC5 reference point", 3GPP TSG SA WG2 #131 S2-1901749, Feb. 19, 2019, pp. 1-pp. 2., Tenerife, Spain.
JP Office Action for JP Application No. 2022-504006, mailed on Apr. 4, 2023 with English Translation.
Tencent, LG Electronics, TS 23.287 EN#1 on Application Layer ID, SA WG2 Meeting #134, S2-1907406, Jun. 18, 2019.
International Search Report for PCT Application No. PCT/JP2020/030749, mailed on Nov. 24, 2020.
3GPP TS 33.185 V14.1.0 (Sep. 2017) "Security aspect for LTE support of Vehicle-to-Everything (V2X) services", pp. 1-10.
3GPP TS 33.401 V15.8.0 (Jun. 2019) "3GPP System Architecture Evolution (SAE); Security architecture", pp. 1-163.
3GPP TS 33.501 V15.5.0 (Jun. 2019) "Security architecture and procedures for 5G system", pp. 1-190.
3GPP TR 33.836 V0.2.0 (Jun. 2019) "Study on Security Aspects of 3GPP support for Advanced V2X Services (Release 16)", pp. 1-21.
3GPP TS 23.287 V1.1.0 (Jul. 2019) "Architecture enhancements for 5G System (5GS) to support Vehicle-to-Everything (V2X) services (Release 16)", pp. 1-50.
3GPP TS 33.303 V12.2.0 (Dec. 2014) "Proximity-based Services (ProSe); Security aspects (Release 12)", pp. 1-63.
S2-188564, Qualcomm Incorporated, "Unicast link establishment solution for eV2X", 3GPP Draft, vol. SA WG2, Aug. 26, 2018, pp. 1-5.
JP Office Action for JP Application No. 2023-186128, mailed on Sep. 3, 2024 with English Translation.

* cited by examiner

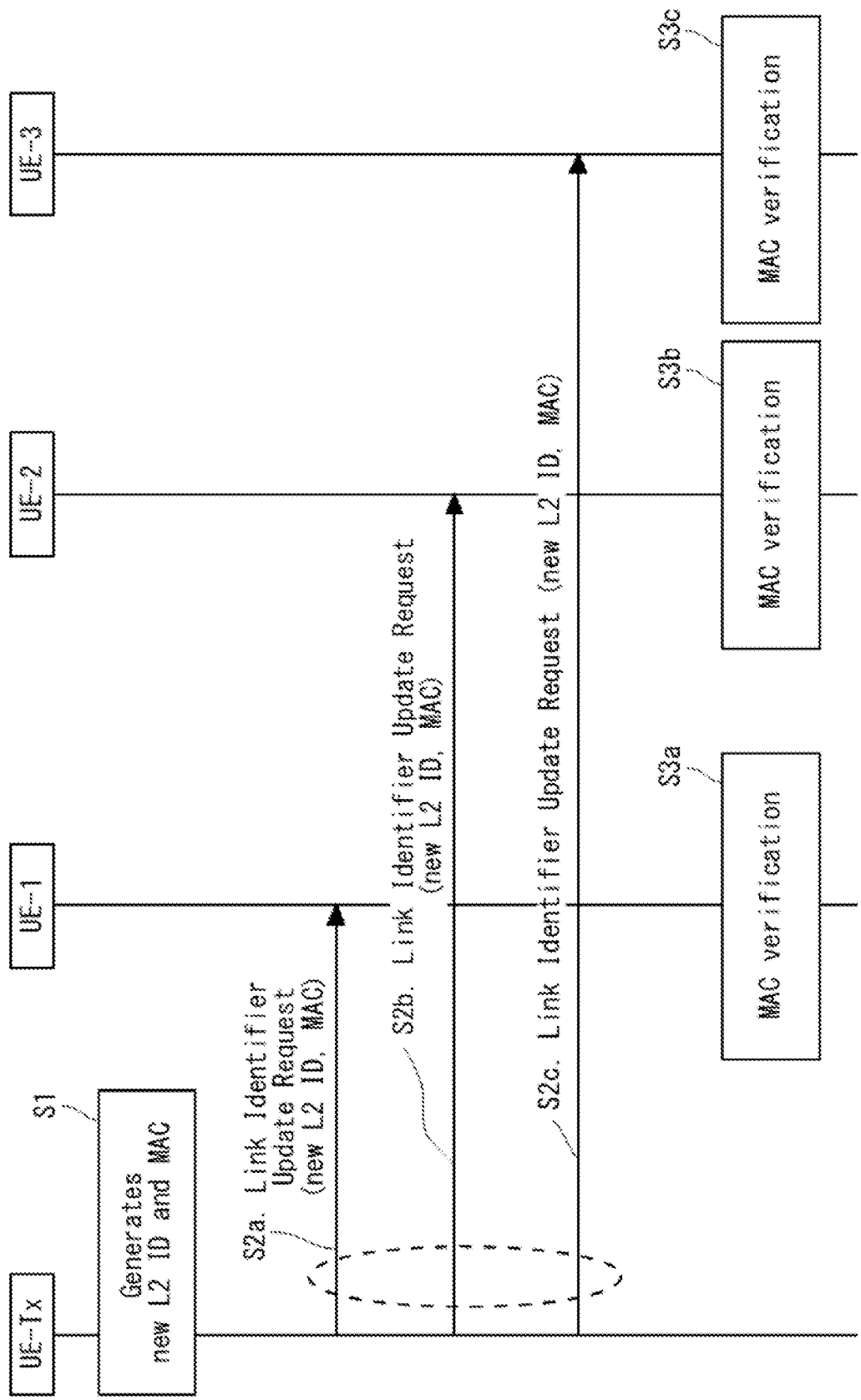

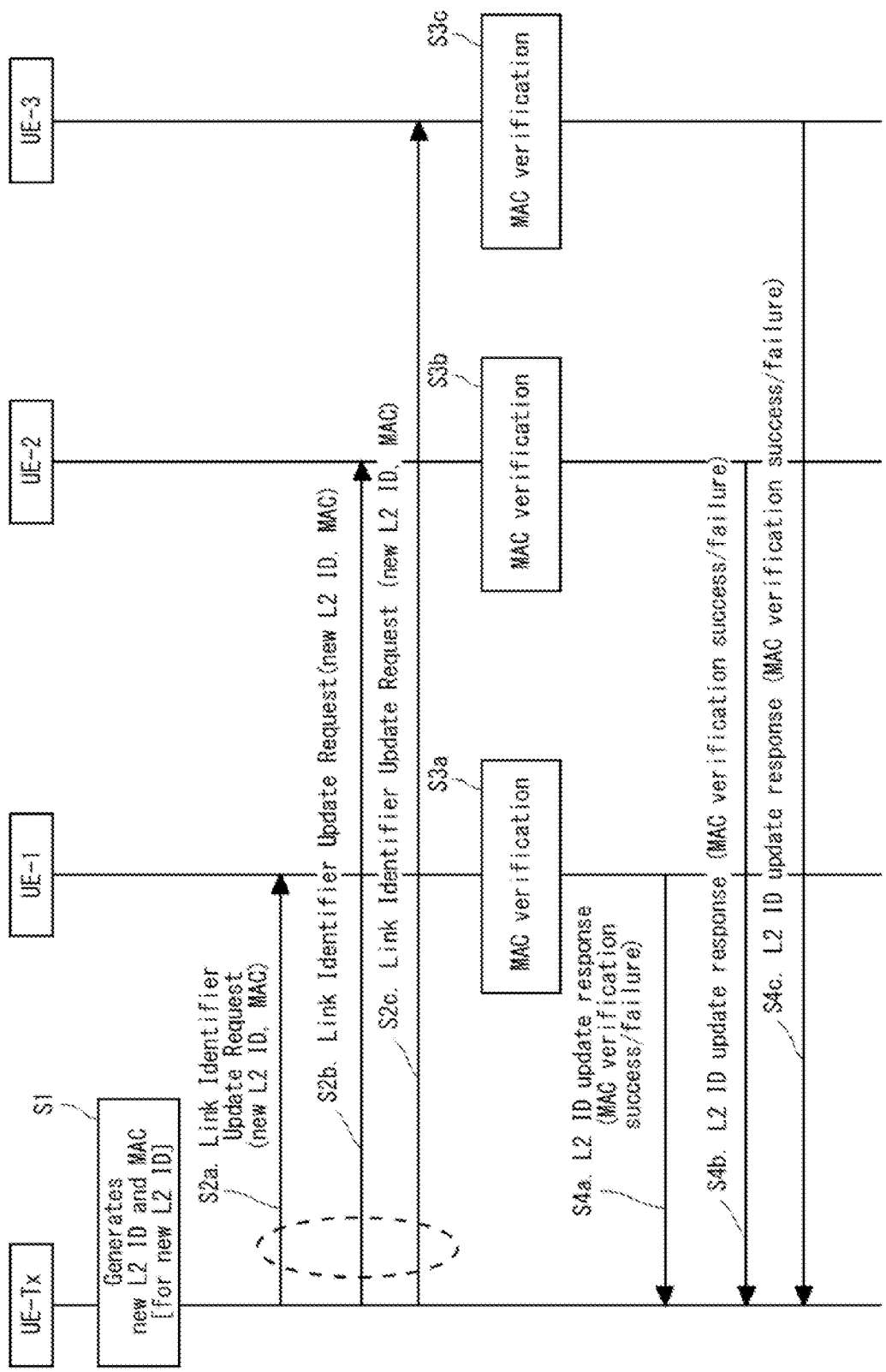

METHOD AND DEVICE FOR REDUCING SECURITY RISK IN COMMUNICATION

This application is a National Stage Entry of PCT/JP2020/030749 filed on Aug. 13, 2020, which claims priority from Indian patent application Ser. No. 201911033136 filed on Aug. 16, 2019, and Indian patent application Ser. No. 201911043095 filed on Oct. 23, 2019, the contents of all of which are incorporated herein by reference, in their entirety.

TECHNICAL FIELD

The present disclosure relates to a communication system, a user equipment, a communication method and a computer readable medium.

BACKGROUND ART

There have been developments with regard to mobile communications technology. For example, in 3GPP (3rd Generation Partnership Project) Release-14 and Release-15, V2X (Vehicle-to-Everything) communication was defined for LTE (Long Term Evolution).

Regarding the V2X communication, Non Patent Literature 1 describes a study of security aspects of LTE support for V2X services. The NPL1 says that there is a risk of a vehicle being tracked and thus its privacy being compromised.

CITATION LIST

Non Patent Literature

NPL 1: 3GPP TS 33.185: "Security aspect for LTE support of Vehicle-to-Everything (V2X) services", 2017

SUMMARY OF INVENTION

Technical Problem

Considering the situation shown above, an object of the present disclosure is to provide a communication system, a user equipment, a communication method and a computer readable medium capable of reducing the security risk in communication.

Solution to Problem

In a first example aspect, a communication system comprises: a first UE (User Equipment) sending a message including L2 ID (Layer 2 Identity) and verification information; and the second UE(s) receiving the message from the first UE and determining whether to accept the L2 ID or not using the verification information.

In a second example aspect, UE (User Equipment) comprises: a sending means for sending a message including L2 ID and verification information to another UE(s); and wherein the verification information allows another UE(s) to determine whether to accept the new L2 ID or not.

In a third example aspect, UE (User Equipment) comprises: a receiving means for receiving a message including L2 ID and verification information from another UE(s); and a determining means for determining whether to accept the L2 ID or not using the verification information.

In a fourth example aspect, a communication method comprises: sending a message including L2 ID and verification information to UE(s); and wherein the verification information allows the UE(s) to determine whether to accept the new L2 ID or not.

In a fifth example aspect, a communication method comprises: a communication method comprises: receiving a message including L2 ID and verification information from UE(s); and determining whether to accept the L2 ID or not using the verification information.

In a sixth example aspect, a non-transitory computer readable medium stores a program for causing a computer to: send a message including L2 ID and verification information to UE(s); and wherein the verification information allows the UE(s) to determine whether to accept the new L2 ID or not.

In a seventh example aspect, a non-transitory computer readable medium stores a program for causing a computer to: receive a message including L2 ID and verification information from UE(s); and determine whether to accept the L2 ID or not using the verification information.

Advantageous Effects of Invention

According to the present disclosure, it is possible to provide a communication system, a user equipment, a communication method and a computer readable medium capable of reducing the security risk in communication.

BRIEF DESCRIPTION OF DRAWINGS

FIG. 7 is a sequence diagram illustrating procedures of the communication system.
FIG. 8 is a sequence diagram illustrating procedures of the communication system.

DESCRIPTION OF EMBODIMENTS

Figure 1:
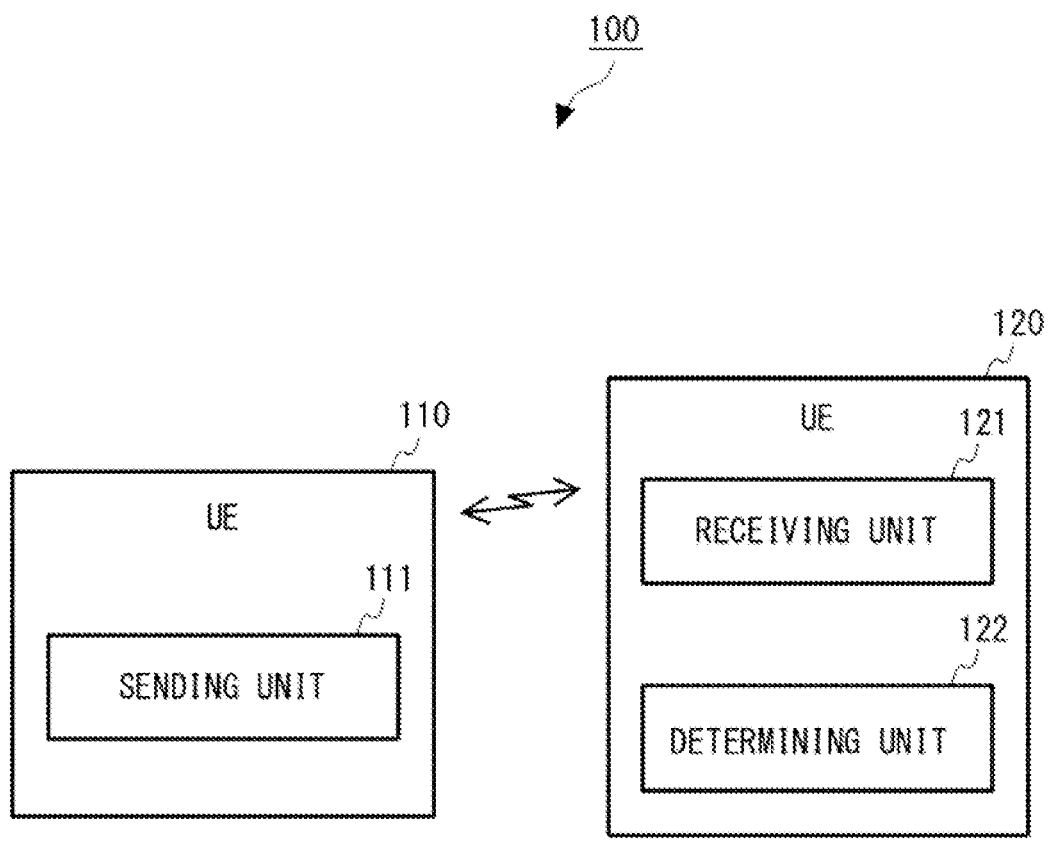
FIG. 1 is a block diagram of a communication system.

Prior to explaining embodiments according to this present disclosure, the following explanatory notes will be given.

Abbreviations

For the purposes of the present disclosure, the following abbreviations apply.
3GPP 3rd Generation Partnership Project
4G 4th Generation
5G 5th Generation
5GC 5G Core Network
5GS 5G System
AF Application Function
AMF Access and Mobility Management Function
AN Access Node
AID Application Identifier
AKA Authentication and Key Agreement
ARPF Authentication credential Repository and Processing Function
AS Access Stratum
AUSF Authentication Server Function
CP Control Plane
D2D Device to Device
EAP Extensible Authentication Protocol
eNB evolved NodeB
EPS Evolved Packet System
EPC Evolved Packet Core
ETSI European Telecommunications Standards Institute
E-UTRA Evolved Universal Terrestrial Radio Access
gNB next Generation NodeB
IEEE Institute of Electrical and Electronics Engineers
IoT Internet of Things
ITS Intelligent Transport Systems
KDF Key Derivation Function
L2 ID Layer 2 Identity
LTE Long Term Evolution ("4G")
M2M Machine to Machine
MAC Message Authentication Code
MBMS Multimedia Broadcast and Multicast Service
MitM Man in the Middle
MME Mobility Management Entity
MTC Machine Type Communication
MVNO Mobile Virtual Network Operator
NAS Non-Access Stratum
NB-IoT Narrow Band IoT
NEF Network Exposure Function
NF Network Function
NG-RAN Next Generation Radio Access Network
NID Network identifier
NR New Radio (5G)
NRF Network Repository Function
NW wNetWork
PCF Policy Control Function
PLMN Public Land Mobile Network
PSID Provider Service IDentity
QoS Quality of Service
(R)AN (Radio) Access Network
RRC Radio Resource Control
SEAF Security Anchor Functionality
SIDF Subscription Identifier De-concealing Function
SMF Session Management Function
UDM Unified Data Management
UE User Equipment
UPF User Plane Function
UDR Unified Data Repository
V2X Vehicle to Everything

Definitions

For the purposes of the present disclosure, the following definitions apply.
PC5 Radio interface between two or more UEs
Uu Radio interface between the UE and the base station
Groupcast A mode of communication where two or more members in the group communicate with one another. The group membership may or may not be managed. In case it is managed, it is expected to be done at the application layer. If it is not done, then it is assumed that the group membership is defined in other methods such as pre-configuration, etc.

RELATED ARTS

As described above, in 3GPP (3rd Generation Partnership Project) Release-14 and Release-15, V2X (Vehicle-to-Everything) communication was defined for LTE. Stage 1 specification by 3GPP SA WG1 (SA1) defines the architectural and security requirements for the V2X communication. Based on advanced use cases specified by SA1 in Release 16, additional architecture enhancements are defined to include 5G V2X. Based on these specifications, LTE V2X communication supports two types of communication i.e., over LTE Uu interface and over LTE PC5 interface. LTE Uu interface supports only unicast mode of communication whereas LTE PC5 interface supports broadcast only.

For communication over LTE PC5 interface, there is only minimal security consideration and mechanism over 3GPP layer and most security mechanisms are assumed to be addressed in application layer. This is in line with other V2X standards e.g., IEEE 802.11p, IEEE 1609, and ETSI ITS. 3GPP SA WG2 (SA2) has completed normative work on eV2X architecture enhancement for Release-16 based on the architectural enhancement requirements defined for stage-1 of release-15 for 5G NR based V2X communication in Release 16. From these specifications, similar to LTE V2X, 5G V2X also supports two types of communication (5G Uu interface and 5G PC5 interface). Communication over 5G Uu, which supports only unicast mode similar to LTE Uu interface. On the other hand, 5G PC5 interface supports two additional modes of communication in addition to broadcast mode: unicast, and groupcast mode of communication. Therefore, these new functionalities in 5G V2X requires additional security considerations for which 3GPP SA WG3 (SA3) has started a study for the security aspects of eV2X communication in 5G. The architectural enhancement on top of Rel-15 LTE V2X specification is based on some new use cases as described below.

The overall security architecture for LTE and 5G are specified in 3GPP TS 33.401: "3GPP System Architecture Evolution (SAE); Security architecture" and 3GPP TS 33.501: "Security architecture and procedures for 5G system", respectively.

As described earlier, there are 2 Radio Access Technologies (RATs) and 2 types of interfaces, resulting in total of 4 types of communication in V2X communication:
1. Uu
a) LTE Uu
b) 5G Uu
2. PC5
a) LTE PC5
b) 5G PC5

These modes of operations are used separately and independently. The privacy requirement for LTE V2X specification states that "If a UE is using the same identity in several broadcast messages, it is possible to track the vehicle and compromise its privacy". This may lead to traceability and linkability of the vehicle and the user. It is important to note that the above-mentioned privacy issue applies only to PC5 interface not to Uu interface. For the Uu interface, the existing LTE-Uu unicast security solution applies.

As mentioned earlier, SA2 specification specifies procedures for V2X communication over PC5, which include layer-2 link establishment, link identifier update, layer-2 link release and layer-2 link modification. Also, key issues in the ongoing SA3 study especially concerns with how to prevent privacy issues related to privacy in unicast and groupcast communication, e.g. source L2 ID tracking of the vehicle and the user. An adversary that is capable of connecting and linking L2 identities to a real or a long-term (permanent) eV2X endpoint identity will be able to track and trace the endpoint over space and time. Such traceability and link ability will be an attack on eV2X endpoint privacy.

In unicast communication, change of source L2 ID is essential for receiving peer to continue to identify the source of the message. In broadcast or groupcast V2X communication, the destination L2 ID=broadcast L2 ID or groupcast L2 ID, and the source L2 ID=ID of the individual group member UE who sends the message.

In groupcast or broadcast mode, change of source L2 ID means that all group member UEs need to keep track of this change to continue to identify the source of the message, i.e., to keep track of "who sent the message to the group" at all time.

Therefore, if one UE misses a L2 ID update message from another group member UE in broadcast or groupcast mode, it means that the receiving UE can still receive the broadcast/groupcast messages (destination L2 ID is unchanged), but the receiving UE can no longer identify "who sent the message". This situation must be mitigated and recoverable from this condition.

This also implies that the source L2 ID change initiated by a UE must be verifiable by the receiving UEs to avoid a malicious UE from disrupting the legitimate UE's communication. This verifiability is required because the communication in the broadcast mode is unmanaged (the number and the identity of the receivers are unknown), and membership management in groupcast is less stringent than unicast communication establishment. Therefore, all member UEs in broadcast and groupcast need to be in sync with respect to the UE's L2 ID change.

For privacy protection, the 3GPP specifications for LTE and 5G V2X communication states that, if a UE is using the same identity in communication over PC5 interface, it is possible to track the vehicle and compromise its privacy. Therefore, communication privacy protection over PC5 interface is required to mitigate the risk of a user or a vehicle being tracked.

a) The existing SA3 study includes solution for privacy and security aspects for L2 ID update in unicast mode of communication. Similar to unicast mode, privacy protection is equally applicable to broadcast and groupcast operation mode also. In broadcast mode, the transmitter UE does not know who are listening to the broadcast message. In Groupcast mode, a member UE who left the group or someone who knows the groupcast destination L2 ID can track and identify of the source of the message i.e. vehicle or user identity.

b) The source L2 ID change in PC5 communication must be verifiable by the receiving UEs to avoid a malicious UE from disrupting the legitimate UE and its broadcast and groupcast communication modes.

c) Application layer messages (e.g. basic safety messages) continue independent of L2 ID update events. The application layer messages often involve safety messages to avoid traffic accident. These messages usually require low latency communication. L2 ID change event should not disrupt the ongoing application layer messaging.

As described earlier, there are two modes of operation for V2X communication, namely communication over PC5 reference point and over Uu reference point. These two operations may be used by a UE independently for transmission and reception. V2X communications over PC5 reference point are supported by LTE and/or NR. V2X communications over Uu reference point are supported by E-UTRA connected to EPC or 5GC and/or NR connected to 5GC. In this release, V2X communication over Uu reference point uses only unicast transmission and reception. In LTE PC5 communication, only the broadcast mode is supported. On the other hand, 5G PC5 supports broadcast and groupcast mode in addition to unicast mode of communication.

Identifiers for the V2X communication procedure:

a) Each UE has a L2 ID for the V2X communication over PC5 reference point. It is included in the source Layer-2 ID field of every frame that the UE sends on the layer-2 link. The UE self-assigns the Layer-2 ID for the V2X communication over PC5 reference point.

b) When IP based V2X messages are supported, the UE auto-configures a link-local IPv6 address to be used as the source IP address. The UE may use the auto-configured link-local IP address for V2X communication over PC5 reference point without sending Neighbor Solicitation and Neighbor Advertisement message for duplicate address detection.

c) If the UE has an active V2X application that requires privacy support in the current Geographical Area, as identified by configuration, in order to ensure that a source UE (e.g. vehicle) cannot be tracked or identified by any other UEs (e.g. vehicles) beyond a certain short time-period required by the application, the source Layer-2 ID must be changed over time and randomized. For IP based V2X communication over PC5 reference point, the source IP address must also be changed over time and randomized. The change of the identifiers of a source UE must be synchronized across layers used for PC5, e.g. when application layer identifier changes, the source Layer-2 ID and the source IP address need to be changed.

d) The UE is configured with the destination Layer-2 ID(s) to be used for V2X services. The Layer-2 ID for a V2X message is selected based on the configuration.

e) The source L2 ID used in PC5 interface may be different for each operation mode and different RATs in the same UE. The following table gives the overview of the difference in LTE V2X and 5G V2X in terms of mode of operation and the different source L2 ID. Different designations for different L2 ID indicates that these ID values may be different.

TABLE 1

| PC5 communication RAT types and modes | | |
| --- | --- | --- |
| Mode of operation | LTE V2X | 5G V2X |
| Broadcast mode | L2 ID 1 | L2 ID 2 |
| Groupcast mode | (not supported) | L2 ID 3 |
| Unicast mode | (not supported) | L2 ID 4 |

Each of these source L2 IDs is assigned or re-assigned independently by the UE. The destination ID may be pre-configured and is dependent on the communication mode.

In the study item on the security for V2X in 5G (3GPP TR 33.836: "Study on security aspects of 3GPP support for advanced V2X services") there are existing key issues and solutions. One of the key issues is for the privacy protection for groupcast messages over PC5 interface.

This disclosure mainly relates to how a traceability attack on a UE in a mobile communication system is mitigated, and focuses on the privacy protection of broadcast and groupcast communication. However, it is equally applicable to privacy protection in unicast communication also.

Also, this disclosure relates to the aspects of the 5G system that support V2X communication in 5G in the context of how the source L2 ID update procedure provides privacy protection of the users in broadcast, groupcast, or unicast V2X communication.

DESCRIPTION OF EMBODIMENTS

This disclosure describes multiple embodiments and variants for each embodiment. These embodiments and variants can be arbitrarily combined with each other.

Embodiment 1: Verifiable L2 ID Update in Broadcast and Groupcast Mode

Embodiment 1, Variant 1a, Generic Description

In this proposed embodiment, a communication system 100 comprises a UE 110 (the first UE) and a UE 120 (the second UE) in FIG. 1. In FIG. 1, one UE 110 and one UE 120 are shown, however there may be multiple UEs 110 and/or UEs 120.

The UE 110 sends a message including L2 ID (Layer 2 Identity) and verification information to the UE 120. FIG. 1 shows the UE 110 includes a sending unit 111, which sends a message including L2 ID and verification information to another UE(s), especially the UE 120. The verification information allows another UE(s) to determine whether to accept the new L2 ID or not.

The UE 120 receives the message from the UE 110 and determines whether to accept the L2 ID or not using the verification information. FIG. 1 shows the UE 120 includes a receiving unit 121 and a determining unit 122. The receiving unit 121 receives a message including L2 ID and verification information from another UE(s), especially the UE 110. The determining unit 122 determines whether to accept the L2 ID or not using the verification information.

In this variant 1a, the UE 110 sends the verification information and the UE 120 uses this information to determine whether to accept the L2 ID or not. Therefore, the UE 120 can reject communication from malicious UE(s) and reduce a security risk in the communication.

Embodiment 1, Variant 1b, Generic Description

In this variant 1b, a more detailed explanation of Embodiment 1 will be given.

Figure 2:
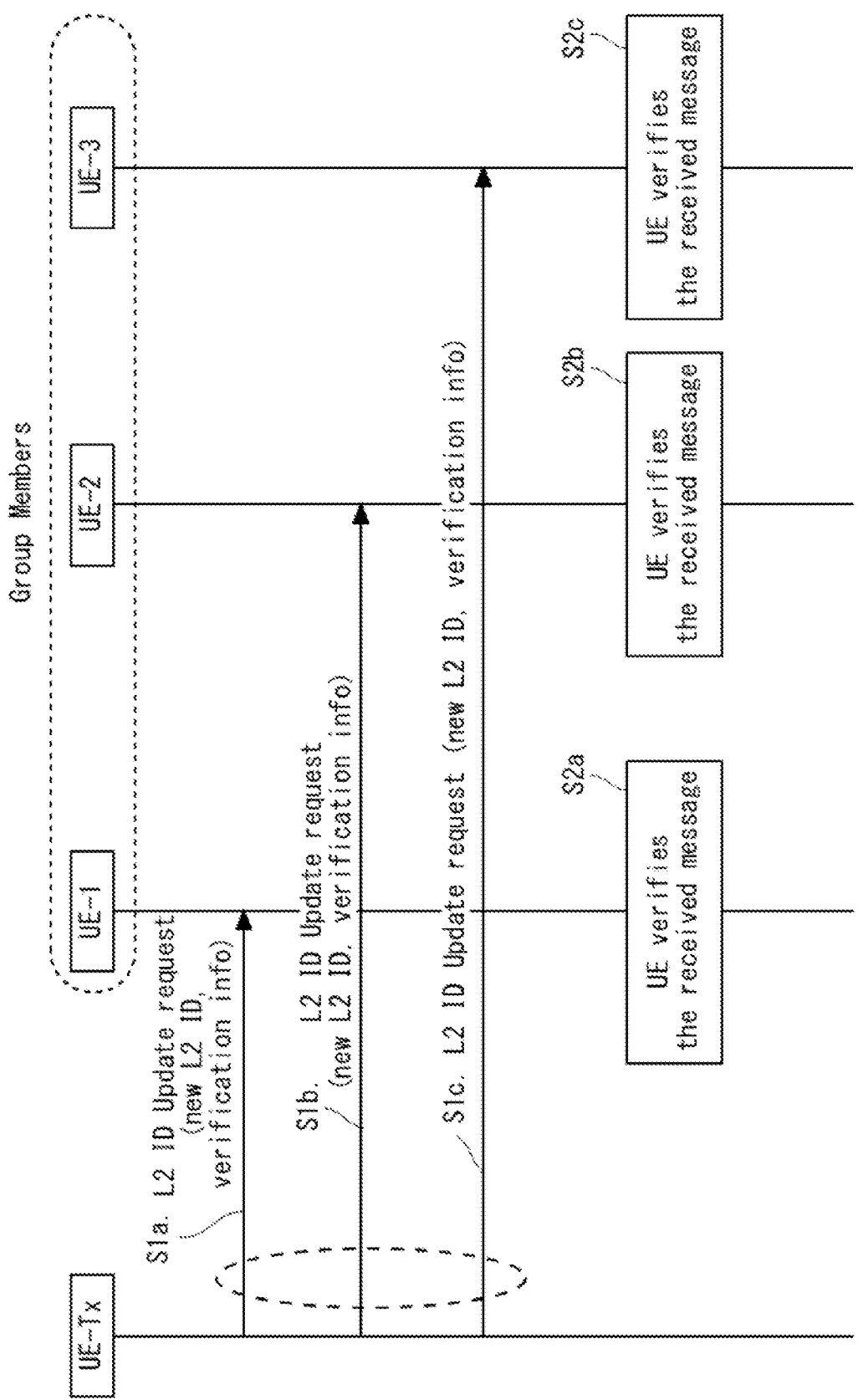
FIG. 2 is a sequence diagram illustrating procedures of the communication system.

In FIG. 2, a transmitting UE sends a newly derived L2 ID to the peer UEs in the L2 ID update request message. The receiving UE(s) verify(ies) the legitimacy of the sender of the update message. This will prevent a malicious UE from sending a fake update message to one or more UEs in the broadcast, groupcast, or unicast communication. It is assumed that security (e.g. encryption and integrity protection) is provided at the application layer (in-line with other V2X technologies, e.g. IEEE 802.11p, IEEE 1609, ETSI ITS).

In order to verify the message from any member UE, the update message contains information that shows the message is a valid one i.e., a genuine user sent it. Examples of the information elements used are as follow:
1. Current L2 ID
2. New L2 ID
3. Group ID (groupcast only)
4. V2X service ID (e.g. PSID or ITS-AIDs)
5. Other information (e.g. time/location information)
6. MAC (Message Authentication Code) or hash value of the above information An example message flow is illustrated in the following figure. In this disclosure, the V2X includes V2V, V2I, V2N, and V2P.

S1a~S1c in FIG. 2 show that the transmitting UE (UE-Tx) sends the L2 ID update request message containing verification information. This information allows the receiving UEs to verify the validity of the source of the message.

S2a~S2c in FIG. 2 show that the receiving UEs (UE-1 through UE-3 in the FIG. 2) verify the validity and authenticity of the source of the message using the information contained in the L2 ID update message from UE-Tx, and determine whether the received message was sent by a legitimate UE or not. If the validity and authenticity of the source of the message is confirmed, the receiving UEs accept the received update message. If the same is not confirmed, then the receiving UEs do not accept the received update message. This action by the receiving UEs prevents a malicious UE from sending a fake update message to broadcast, groupcast or unicast communication.

In the case of broadcast and groupcast communication, there can be 1 or more member UEs that receive the L2 ID update message. In the case of unicast communication, there is only 1 UE that receives the L2 ID update message.

Embodiment 1, Variant 2, Description: Verifiable L2 ID Update in Broadcast and Groupcast Communication In this variant, we introduce a Key Derivation Function (KDF), which is used to derive the New L2 ID and the MAC (or "hash value") using appropriate inputs as described in previous section.

It should be noted that the term "KDF" is used to generically refer to a function that takes a set of input parameters and generate one or more output parameter(s). In this particular example, the KDF does not generate a "key." However, this terminology is generally applicable to other type of similar functions. Therefore, we use the term KDF in this disclosure also.

Figure 3:
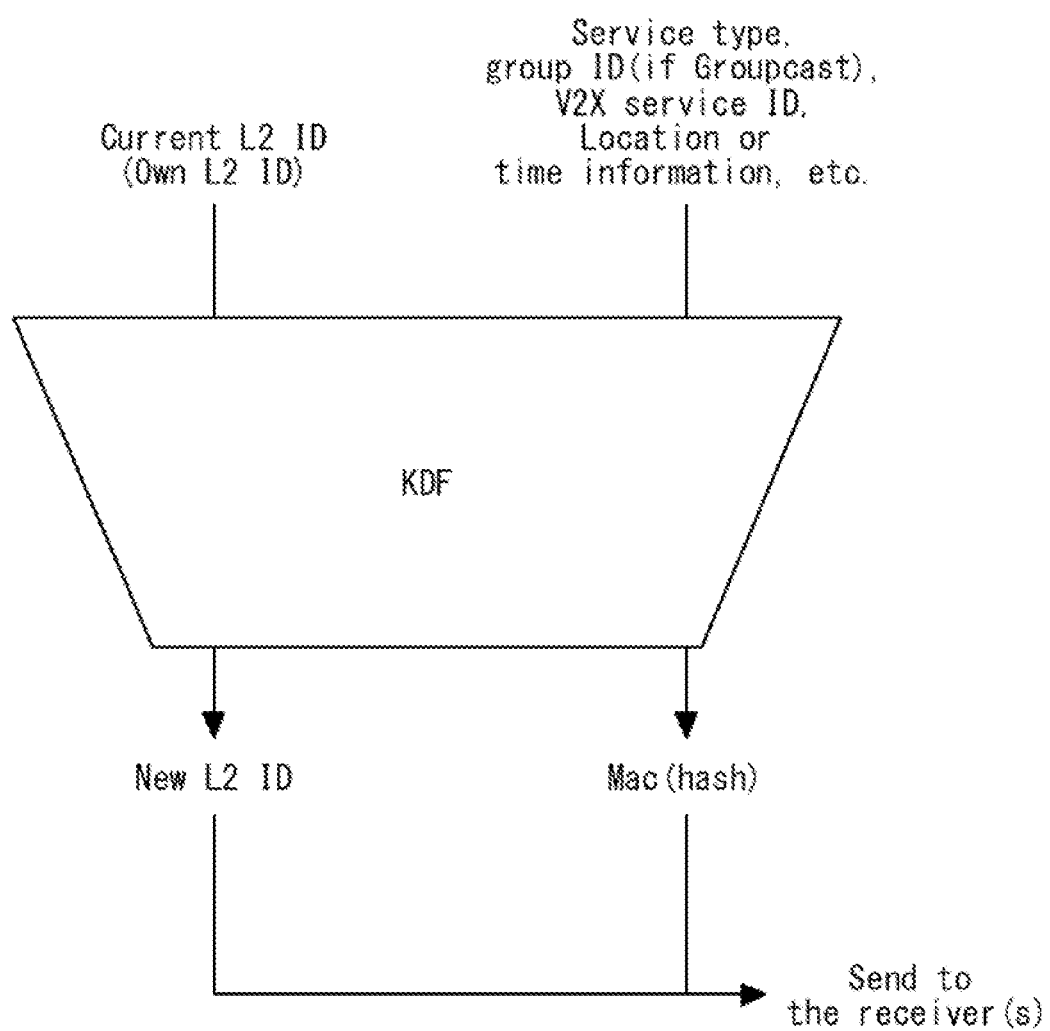
FIG. 3 is a figure illustrating an example of KDF function on a sender side.

As an example of this KDF, as mentioned in the previous section, these inputs can contain information such as the current L2 ID, service type, group ID (applicable for groupcast only), V2X service ID (e.g. PSID or ITS-AIDs), and other information such as time or location information. Based on these inputs, the MAC (i.e., hash of the above information) and new L2 ID are generated as the output of the KDF function. FIG. 3 illustrates an example of the KDF function on the sender side.

An exemplary formula to derive new L2 ID and MAC value can be defined as follows:
(New L2 ID, MAC)=KDF (Current L2 ID, Group ID, V2X service ID, Location or Time Information, etc.).

In another example, additional or different types of input parameters can be used to derive the KDF function to achieve the same result to uniquely identify the validity of the L2 ID update message and the sender. This newly generated L2 ID and the MAC will be updated to all peer member UE(s) in the groupcast, broadcast, or unicast communication.

Figure 4:
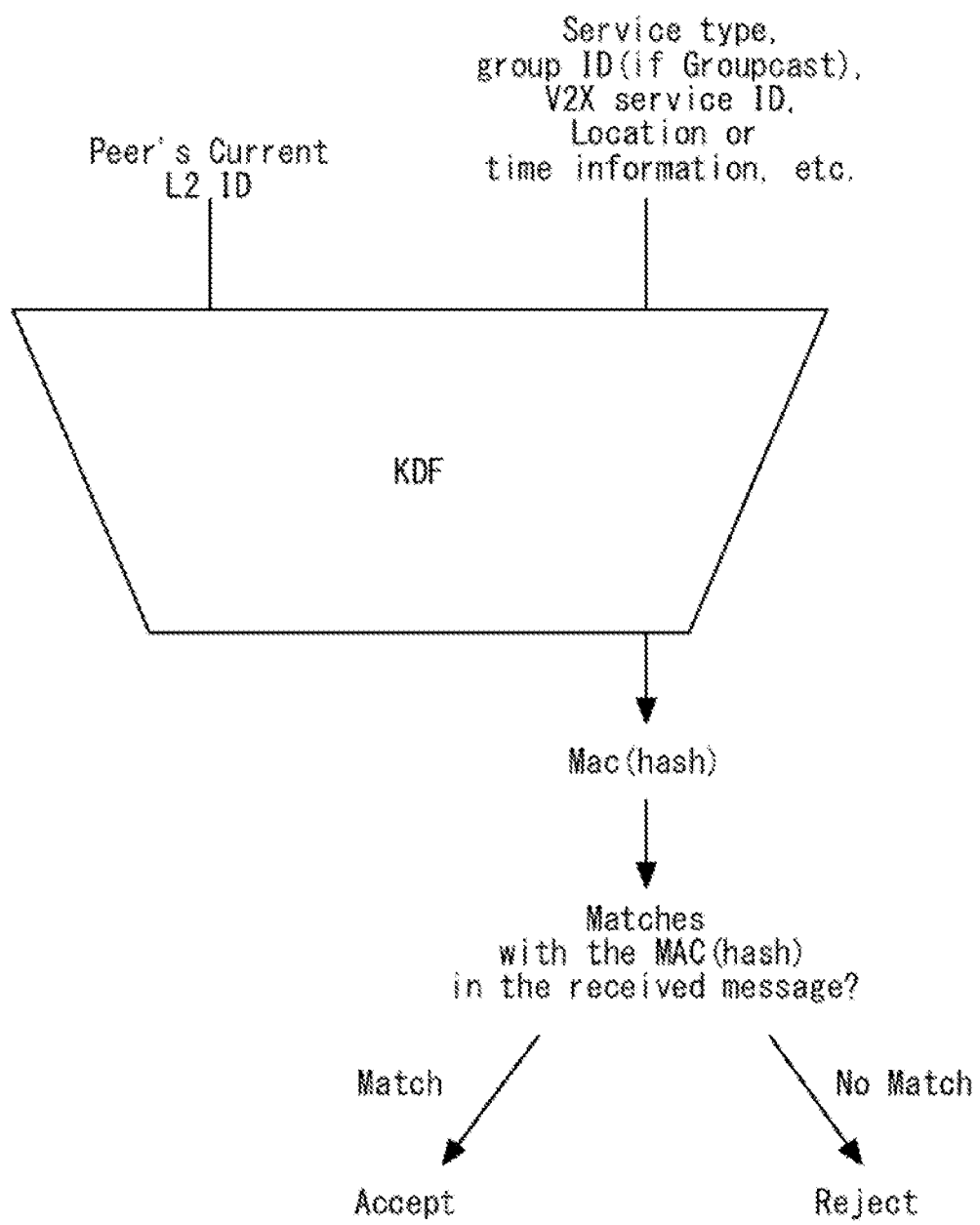
FIG. 4 is a figure illustrating an example of KDF function on a receiver side.

The receiving UE, upon receiving the L2 ID update message, verifies the validity and authenticity of the sender of the message. The receiving UE uses peer's current L2 ID and set of input parameters, which are the same as the ones used by the sender. The receiving UE calculates the MAC (hash value) of the input parameters. Then the receiving UE compares the MAC (hash) value with the one received in the L2 ID update message. If they match, then the receiving UE considers the message comes from an authentic UE and accepts the new L2 ID send in the received message. However, if they do not match, then the receiving UE considers the message comes from a malicious UE and rejects the new L2 ID send in the received message. FIG. 4 illustrates an example of the KDF function on the receiver side.

In this variant, the sending UE includes a generating unit for generating the new L2 ID and the first MAC using the KDF function and the sending unit (111 in FIG. 1) sends the message additionally including the MAC. The receiving UE includes a generating unit for generating the second MAC using KDF, and the determining unit (122 in FIG. 1) compares the first MAC with the second MAC to determine whether to accept the L2 ID or not. By using KDF, the sending UE can derive the New Layer 2 ID and MAC easily, and the receiving UE can determine the validity of the new L2 ID easily.

Embodiment 1, Variant 3, Description: Verifiable
L2 ID Update in Broadcast and Groupcast
Communication with Replay Protection Similar to Embodiment 1, variant 2, this variant also describes the method to verify L2 ID update in broadcast, groupcast, or unicast mode. In addition, an additional Information element is included as input to the Key Derivation Function in order to mitigate a replay attack. In this variant, we introduce "Sequence number" as an input to the Key Derivation Function (KDF). The main advantage of this solution is to prevent a Man-in-the-Middle (MitM) replay attack.

Figure 5:
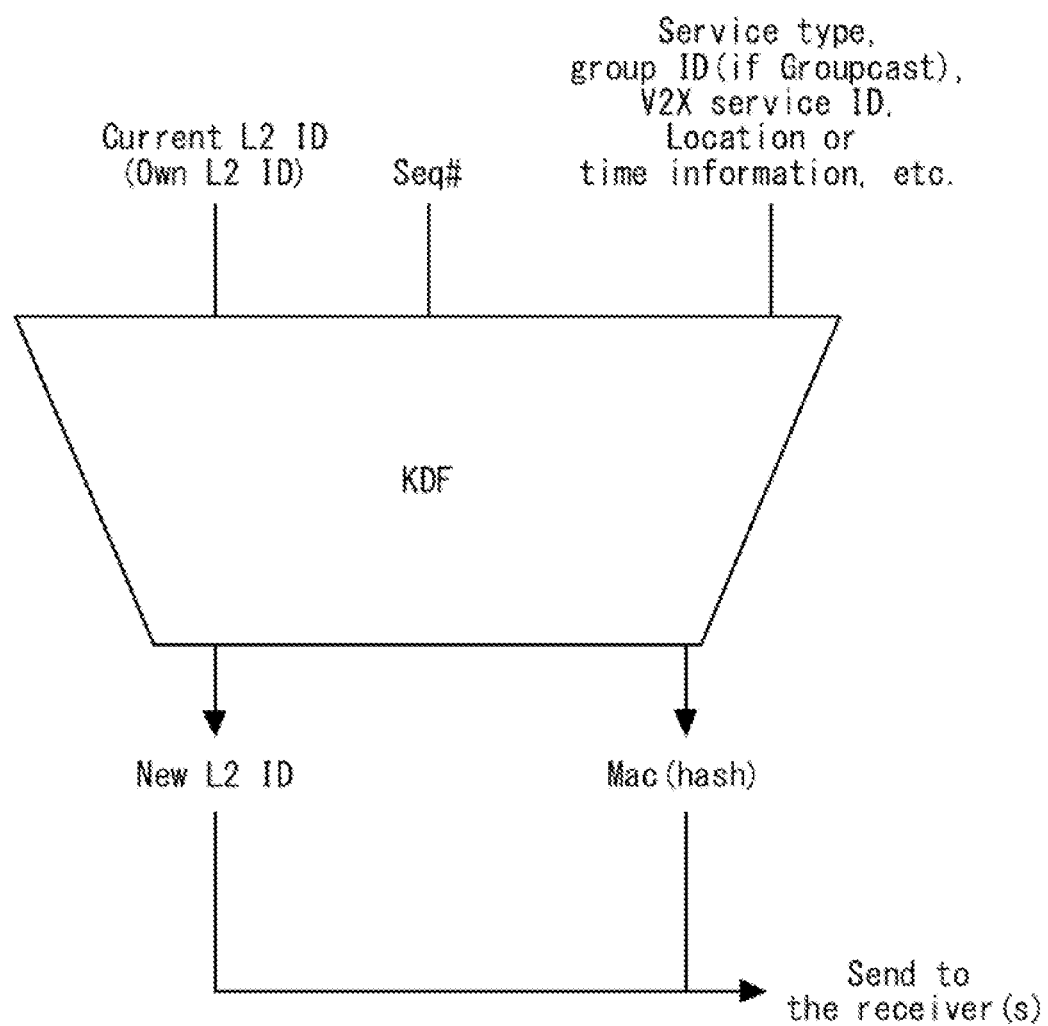
FIG. 5 is a figure illustrating an example of KDF function on a sender side.
Figure 6:
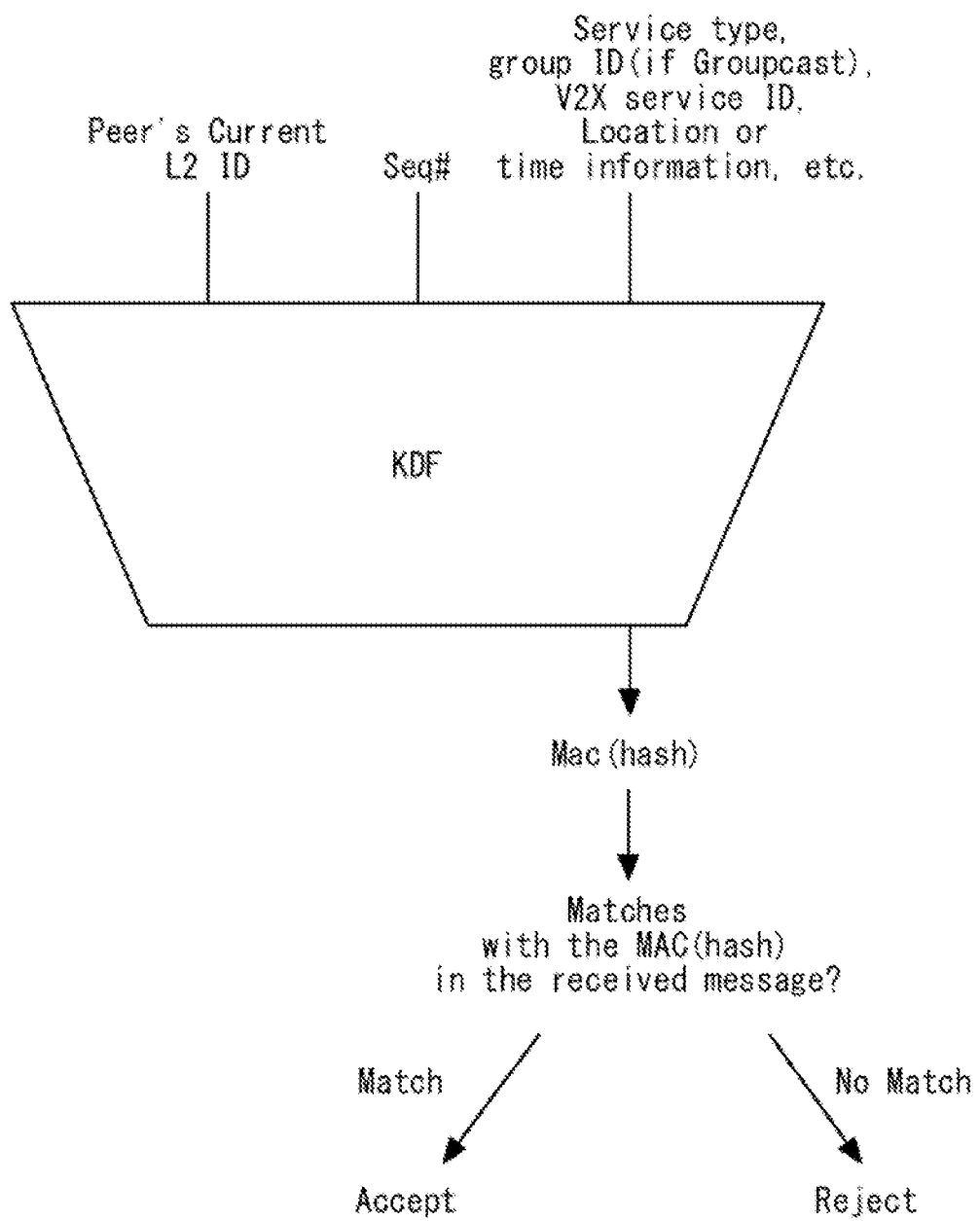
FIG. 6 is a figure illustrating an example of KDF function on a receiver side.

The FIG. 5 below depicts the derivation of new L2 ID and the MAC at the sender side, and FIG. 6 depicts the derivation of MAC at receiver side for verification of the MAC value.

FIG. 5 shows the sending UE uses current L2 ID and input parameters for the KDF function, likewise in FIG. 3. Furthermore, the sending UE uses also a sequence number to generate NEW L2 ID and MAC (hash value).

Similar to Embodiment 1 variant 2, the receiving UE, upon receiving the L2 ID update message, verifies the validity and authenticity of the sender of the message. The receiving UE uses peer's current L2 ID and set of input parameters, which are the same as the ones of the sender. Furthermore, to generate MAC (hash value), the receiving UE uses also the sequence number, which is the same as the one used by the sending UE. Then the receiving UE compares the MAC (hash) value with the one received in the L2 ID update message. If they match, then the receiving UE considers the message comes from an authentic UE and accepts the new L2 ID send in the received message. However, if they do not match, then the receiving UE considers the message comes from a malicious UE and rejects the new L2 ID send in the received message.

It should be noted that the use of sequence number verifies that the received L2 ID update message is not a duplicate of previously sent message. It is achieved by sending UE incrementing the sequence number each time the L2 ID update message is sent.

Embodiment 1, Variant 4, Description: One-Way
Update with No Confirmation

This variant describes a one-way update procedure for L2 ID update with no confirmation. In this variant, the transmitter UE sends the updated new L2 ID to the peer UEs in the broadcast or groupcast mode without receiving acknowledgement from the receiving UEs. In the broadcast or groupcast modes, it is advantageous to reduce overhead to receive and keep track of acknowledgements from other UEs, e.g. if the number of receiving UE is large. In the broadcast mode, it is not possible to know in advance which and how many receiving UEs are present in the range of communication.

Therefore, the main advantage of this solution is to enhance the scalability of the L2 ID update procedure irrespective of the number of peer UEs in the group.

It also reduces the overhead as discussed earlier, as there is no acknowledgement response sent by the peer UEs. The sending UE does not need to keep track of acknowledgements from all member UEs. An example procedure is illustrated in FIG. 7.

S1 in FIG. 7 show that the sender UE (UE-Tx) updates its own L2 ID.

S2a~S2c in FIG. 7 show that the transmitting UE (UE-Tx) sends the L2 ID update request message, containing verification information (e.g. MAC). This MAC (hash) value is calculated based on the method such as described in embodiment variant 1 or variant 2. This information allows the receiving UEs to verify the validity of the source of the message.

S3a~S3c in FIG. 7 show that the receiving UEs (UE-1 through UE-3 in FIG. 7) verify the validity and authenticity of the source of the message using the information contained in the L2 ID update message from UE-Tx, and determine whether the received message was sent by a legitimate UE or not. If the validity and authenticity of the source of the message is confirmed, the receiving UEs accept the received update message. If the same is not confirmed, then the receiving UEs do not accept the received update message. This action by the receiving UEs prevents a malicious UE from sending a fake update message to broadcast, groupcast or unicast communication.

Embodiment 1, Variant 5, Description: Two-Way
Update with Confirmation

In this variant, the receiving UE sends the acknowledgement in response to the L2 ID update from the first UE by sending L2 ID update response message. This way, this solution variant allows the sending UE to keep track of acknowledgement from other UE(s) in the communication. Therefore, this variant guarantees in-sync update of new L2 ID at all time.

The main advantage of this variant is that, the transmitter UE will be aware of whether the receiving UE(s) has/have successfully received the L2 ID update message or not. This variant is advantageous in groupcast mode communication consisting of small number of UE in the group. An example procedure is illustrated in FIG. 8.

S1 in FIG. 8 is the same as S1 in FIG. 7 in the Embodiment 1, variant 4.

S2a~S2c in FIG. 8 are the same as S2a~S2c in FIG. 7 in the Embodiment 1, variant 4.

S3a~S3c in FIG. 8 are the same as S3a~S3c in FIG. 7 in the Embodiment 1, variant 4.

S4a~S4c in FIG. 8 show that the receiving UEs (UE-1~UE-3) sends the L2 ID update response, indicating the success of failure of the verification to the UE-Tx.

Embodiment 1, Variant 6, Description: KDF Algorithm Negotiation

This solution variant introduces a mechanism for the communicating UEs to negotiate and agree on the KDF as described in Embodiment 1, variant 1 and variant 2. In this variant, we introduce a notion of possible differences or variations of the KDF functions among communicating UEs. In this case, this variant allows the communicating UEs to exchange one or more of its supporting KDF function(s) and negotiate the KDF that are agreeable by all UEs.

In one example, the KDF function negotiation may be done at the time groupcast or unicast communication is established.

This variant is advantageous to account for different implementation variations of the KDF function by the UEs. Further, this variant is useful in unicast communication or groupcast communication with small number of member UEs. It should be noted that this variant may not be suitable for broadcast communication where the number of UEs may not be known in advance or groupcast mode with many members in the communication.

Embodiment 1, Variant 7, Description: KDF Input Parameters Negotiation

Similar to the previous embodiment variant 5, this variant proposes that the UE should support similar Discovery/Negotiation/Agreement procedure on the set of input parameters to derive the KDF among member UEs.

This solution variant introduces a mechanism for the communicating UEs to negotiate and agree on the KDF as described in Embodiment 1, variant 1 and variant 2. In this variant, we introduce a notion of possible differences or variations of input parameters used by the KDF among communicating UEs. In this case, this variant allows the communicating UEs to exchange its supporting input parameters used by the KDF and negotiate the set of input parameters that are agreeable by all UEs.

In one example, the parameter negotiation for the KDF function may be done at the time groupcast or unicast communication is established.

This variant is advantageous to account for different implementation variations of the KDF function by the UEs. Further, this variant is useful in unicast communication or groupcast communication with small number of member UEs. It should be noted that this variant may not be suitable for broadcast communication where the number of UEs may not be known in advance.

Embodiment 2: Improved Delivery of L2 ID Update in Groupcast and Broadcast Communication Embodiment 2, Variant 1: Improved Delivery of L2 ID Update in Groupcast and Broadcast Communication In the case of unicast communication, there are only 2 UEs involved in the communication. In this case, it is rather trivial to ensure the successful delivery of the L2 ID update by defining a 2-way request/response message exchange.

However, in the groupcast and broadcast communication, there are multiple UEs involved in the communication, and it introduces a problem where not all UEs may receive the same message successfully at all time.

In groupcast and broadcast mode, there can be scenarios where one or more group member(s) may miss the L2 ID update message (e.g. due to weak radio condition, etc.). This condition implies that such UE(s) can continue to receive groupcast or broadcast messages (due to the destination L2 ID being groupcast or broadcast L2 ID), but it/they is/are no longer able to distinguish where the groupcast or broadcast messages were sent from. This is because the UE that missed the L2 ID update from a given source UE can no longer track the continuity of L2 IDs from that specific source UE, thus can no longer identify who a specific source L2 ID belongs to.

In this respect, it is valuable to increase the chance of successful delivery of the L2 ID update messages in groupcast and broadcast mode. In this disclosure, we discuss two variants to achieve this goal.

This variant introduces mechanisms to maximize the chance of L2 ID update to be received by all group members and re-synchronize the receiving UE in case it misses the original L2 ID update message.

As an example, we consider the scenario where one member UE missed the L2 ID update from the transmitting UE. In this case, all peer UEs except for one successfully receive the updated L2 ID at the time of original transmission. After some period of time, the transmitting UE repeats the L2 ID update message. This way, the member UE who misses the update at the first transmission can receive the updated L2 ID from the same UE.

The time period when the L2 ID update message is repeated can be either configured by the network or can be derived within the UE by itself. In another example, the number of times the same message is repeated is either configured by the network or can be derived within the UE by itself.

Variant 1, sub-variants are as follows:
Variant 1.a: Repeat by the sending UE
Variant 1.b: Relay by the receiving UE
Variant 1.c: Flooding by the receiving UE(s)
Variant 1.d: Combination of (a)~(c)

The following FIG. 9A through 9D illustrate these subvariants.

Figure 9A:
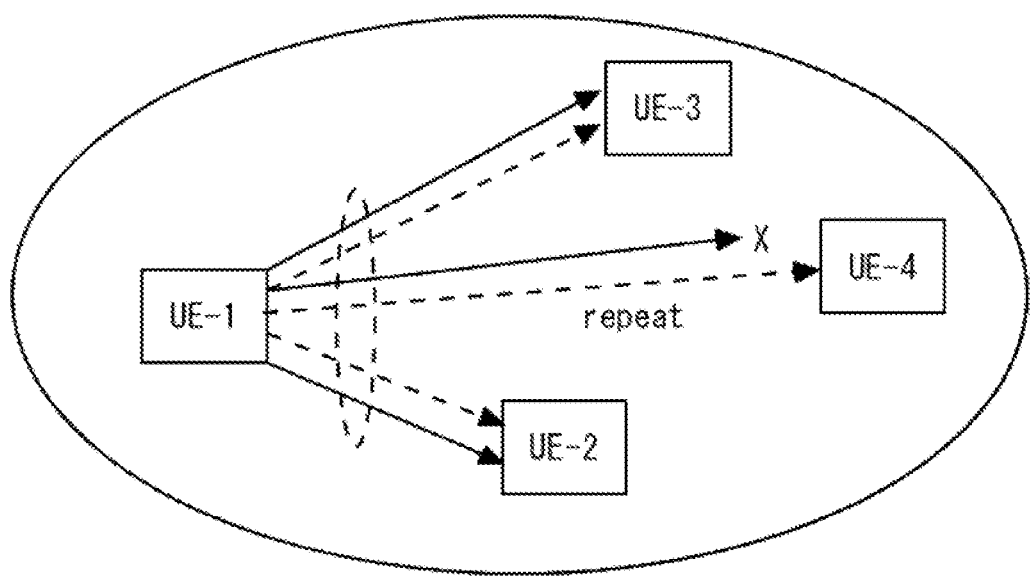
FIG. 9A is a figure illustrating a repeated message from a source UE.

FIG. 9A illustrates the repeated message from the source UE. In this case, UE-4 misses the first L2 ID update message sent by the UE-1, while UE-2 and UE-3 succeed to receive the first L2 ID update message. However, UE-4 successfully receives the same update from the UE-1 in the repeated message. The dashed line indicates the repeated message.

Figure 9B:
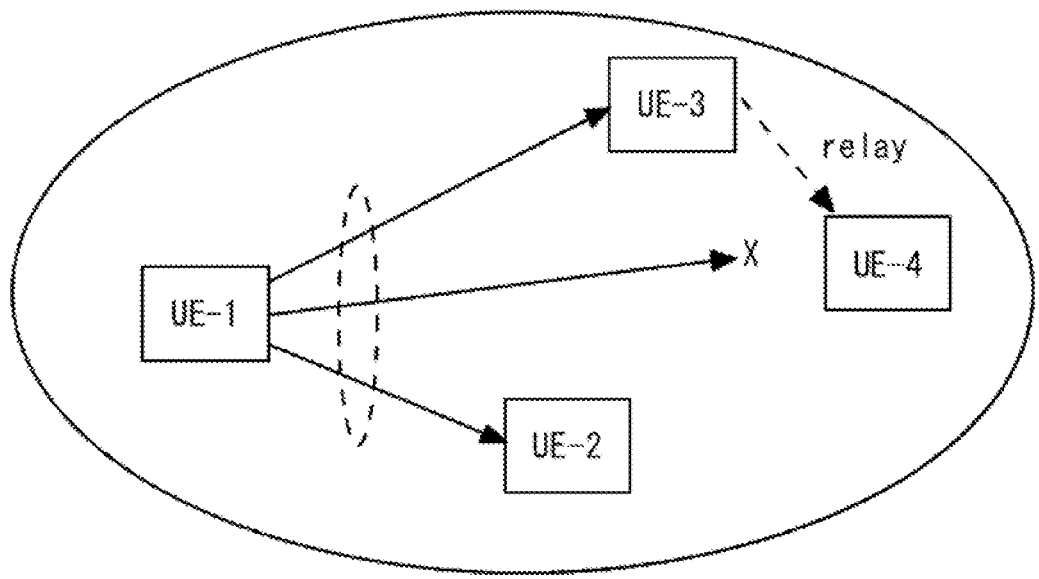
FIG. 9B is a figure illustrating a relayed message from UE(s).

FIG. 9B illustrates the relayed message from the UE(s) that has successfully received the original L2 ID update message. In this case, UE-4 misses the first L2 ID update message sent by the UE-1, while UE-2 and UE-3 succeed to receive the first L2 ID update message. However, UE-4 successfully receives the same update relayed from the UE-3. The dashed line indicates the relayed message from UE-3.

Figure 9C:
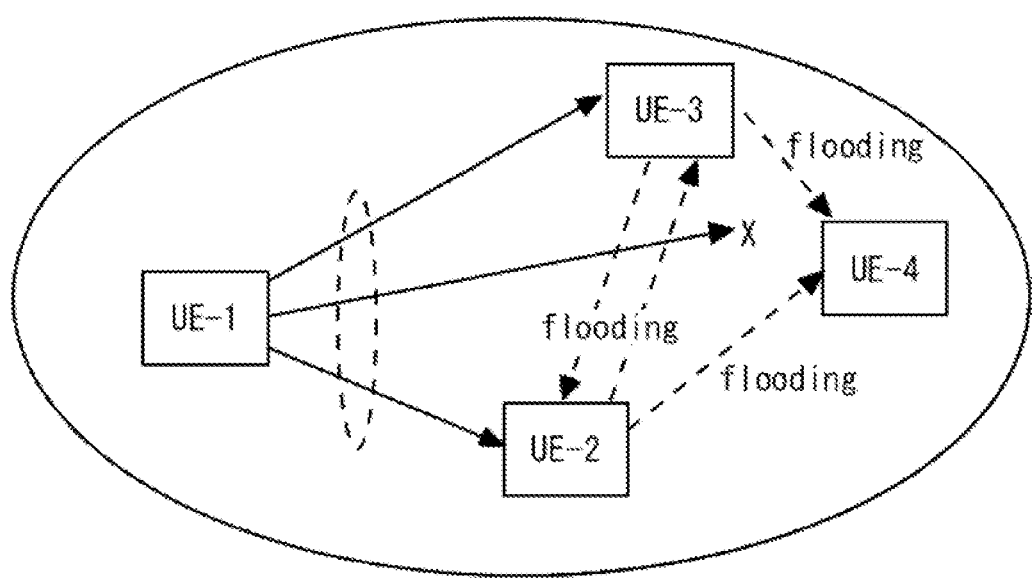
FIG. 9C is a figure illustrating a flooded message from UE(s).

FIG. 9C illustrates the flooded message from the UE(s) that has successfully received the original L2 ID update message. In this case, UE-4 misses the first L2 ID update message sent by the UE-1, while UE-2 and UE-3 succeed to receive the first L2 ID update message. However, UE-4 successfully receives the same update from the UE-2 and UE-3 in the flooded message. The dashed line indicates the relayed message from UE-2 and UE-3.

Figure 9D:
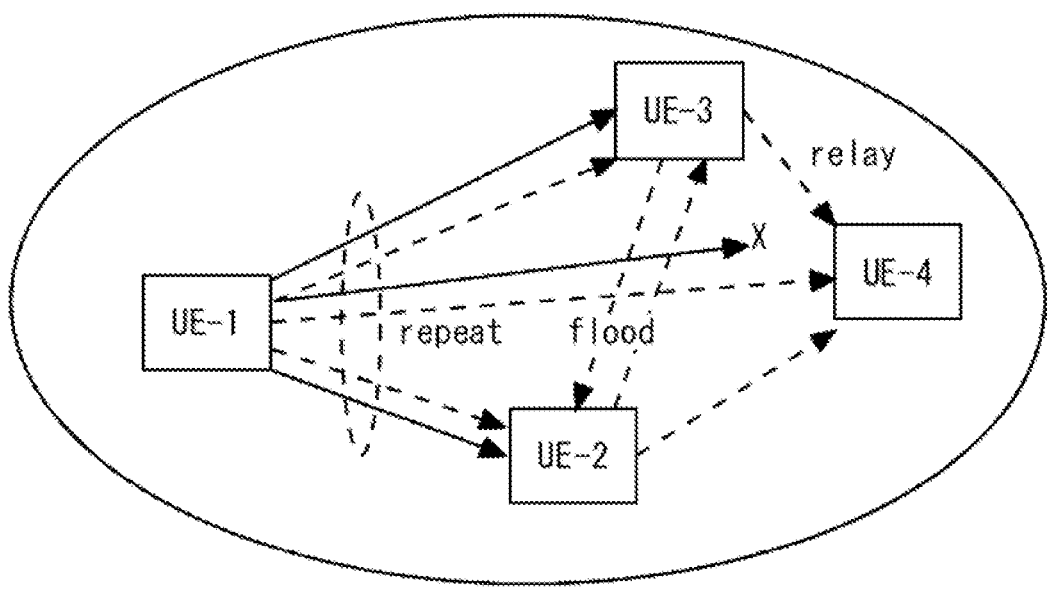
FIG. 9D is a figure illustrating the combination of repeated, relayed, and flooded messages from the UE(s).

FIG. 9D illustrates the combination of repeated, relayed, and flooded messages from the UE(s) that has successfully received the original L2 ID update message. In this case, UE-4 misses the first L2 ID update message sent by the UE-1, while UE-2 and UE-3 succeed to receive the first L2 ID update message. However, UE-4 successfully receives the same update from the UE-1, UE-2, and UE-3 in the repeated, relayed, and flooded message. The dashed line indicates the repeated/relayed/flooded messages from UE-1, UE-2, and UE-3.

Alternatively, the above described variants involve one or more UE(s) possibly receiving the same message more than once (i.e. original message plus the repeated/relayed/flooded message, or two or three of repeated/relayed/flooded messages). As an example, the UEs are capable of detecting such duplicate reception of the same message and discard the duplicate(s).

In alternative example, the repeated/relayed/flooded message may be sent to another destination L2 ID which is specifically intended to deliver the repeated/relayed/flooded messages. Using a different L2 ID specifically intended for repeated/relayed/flooded message simplifies the receiving operation in the UE to quickly detect and ignore any duplicate message(s).

Embodiment 2, Variant 2: Improved Delivery of L2 ID Update in Groupcast and Broadcast with Replay Protection This variant introduces additional functionality on top of the Embodiment 2 variant 1. It avoids a replay attack such as Man-in-the-middle attack by a malicious UE.

This enhancement can be applied to all subvariants in Embodiment 2, variant 1 (i.e., variant 1.a~1.d). The additional functionality in this variant can be described as follows.

We introduce a sequence number upon generating the repeated messages in (Embodiment 2, variant 1, subvariants 1.a~1.d). Each message is provided with a valid sequence number (value). Therefore, when the message is repeated, the repeated message has a different sequence number from the original message. This sequence number is used only once, so that any subsequent attempt to replay the message is rejected by the receiver UE(s).

It should be noted that the sequence number used in this variant serves different purpose from the one introduced in Embodiment 1, variant 2.

In one example, this sequence number can be defined in a more complex manner than just monotonically incrementing number in each successive repeat/replay/flooding of the same message; otherwise it's obvious for an attacker to assume N+1 as the next sequence number and perform a replay attack.

In another example, the last used sequence number can be used as an input to the KDF to derive the next sequence number. This is illustrated in FIG. 10.

In an alternative example, the initial value of the sequence number can be randomly selected by the sender and subsequent repeated message may use the monotonically increasing sequence number as the input. In this case, the sender communicates the initial value to the receiver in a secure manner (e.g. encrypted message using the existing security context including encryption key, etc.).

In these examples, additional parameter(s) unrelated to the sequence number can be used as an input to the KDF.

Figure 10:
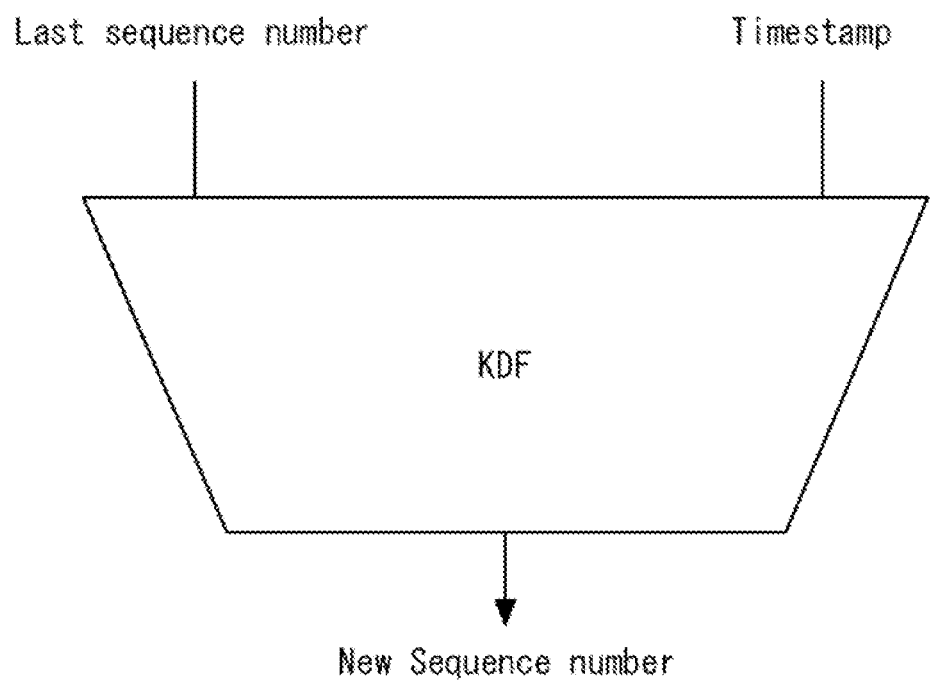
FIG. 10 is a figure illustrating an example of the KDF function to derive a new sequence number.

FIG. 10 illustrates an example of the KDF function to derive the new sequence number using the last used sequence number and additional parameter(s) as an input parameter(s). In FIG. 10, timestamp is used as the additional parameter.

Embodiment 3: Improved Delivery of Application Layer Message in Groupcast, Broadcast and Unicast Communication Embodiment 3, Variant 1: Duplicate Communication During the L2 ID Update The L2 ID update procedures described in Embodiment 1 and Embodiment 2 protect the user and vehicle privacy in the V2X communication. This mechanism occurs periodically for a specified interval set by the system or self-configured in the UE itself.

It should be noted that this L2 ID update procedure occurs separately and independently from the application layer communications (such as basic safety messages to avoid traffic accidents) that use PC5 interface between UEs. This implies that the application layer message events are unaware of this L2 ID update, and thus the flow of application layer messages is triggered and continues independent of such L2 ID update events. This independence of events generally follows the principle of layered concept typically present in communication systems. If the L2 ID update event occurs simultaneously with the application layer message flow, L2 ID update event should not cause unexpected communication disruption among the UEs involved with communication over PC5 interface. This situation applies to broadcast, groupcast, and unicast mode communication. If the communication at the application layer is disrupted due to the event in the lower layer such as L2 ID update, the possible consequence of such disruption may include examples such as missing the application layer messages.

If one or more UEs in the broadcast, groupcast or unicast communication miss the L2 ID update of the UE involved with communication, or the application messages gets delayed or lost due to the event such as L2 ID update, the application layer service may be disrupted as a result. It should be noted that typical V2X application layer communication includes basic safety messages to avoid traffic accident which require very low latency communication. Therefore, preventing the disruption of communication at the application layer is significant. The possible consequence of such event may include the difference between accident and no-accident.

To address this situation and mitigate the potential impact, Embodiment 3, variant 1 proposes the following mechanisms to improve the delivery of application layer messages in groupcast, broadcast and unicast mode of communication.

In this variant, UEs that are involved with broadcast, groupcast, or unicast communication identifies the event where its own L2 ID is changed periodically. At this time, the UE transmits the same application layer messages multiple times (e.g. twice) using the old and new L2 IDs as the source L2 ID. This effectively results in the same application layer messages being repeated multiple times (e.g. twice) using 2 different source L2 IDs. Doing so maximizes the chance that other UE(s) in the communication can successfully receive the application layer messages without disruption when the UE's L2 ID is being changed from one to another.

In one example, the L2 layer that is responsible for the L2 ID update indicates to the upper layer (application layer) that the L2 ID change is taking place. Then the upper layer (application layer) sends the message multiple times (e.g. twice) for each message it generates. This subvariant may be more applicable when the application layer uses IP based communication. It should be noted that, in IP based communication, the source IP address and source L2 ID are updated simultaneously. In this case, the description in this variant regarding the L2 ID change also applies to IP address change.

In another example, the layer 2 that is responsible for L2 ID update detects the time period when the L2 ID update occurs. During this period, the layer 2 transmits the application layer messages from the upper layer using both old and new L2 ID in the communication mode being used by the application layer (i.e. broadcast, groupcast, or unicast). This subvariant may be more applicable when the application layer communication uses non-IP based communication.

In one example, both of the following scenarios results in successful reception of the message sent by the sending UE. Therefore, this variant is advantageous in communication modes where there are multiple receiving UEs, such as broadcast or groupcast mode:

a) If the receiving UE is in the middle of processing the L2 ID update of the sending UE, this receiving UE may still recognize the old L2 ID as the valid ID of the sending UE. In this case, this receiving UE recognizes the message containing the old L2 ID in the source L2 ID field of the message sent by the sending UE.

b) If the receiving UE has already accepted the L2 ID update of the sending UE, this receiving UE may recognize the new L2 ID as the valid ID of the sending UE. In this case, this receiving UE recognizes the message containing the new L2 ID in the source L2 ID field of the message send by the sending UE.

As an example, the time window when this duplication transmission is carried out is defined by a timer—"L2 ID update safeguard timer". In one example, this timer may be configured by the system or self-assigned by the UE itself.

Embodiment 3, Variant 2: Accepting Multiple L2 IDs During the L2 ID Update Occurs In this variant, the receiving UE accepts messages from the sending UE containing either old and new L2 ID as the source ID of the message. The old L2 ID and the new L2 ID used by the sending UE refer to the one that was/is used before and after the L2 ID change procedure, respectively. This solution variant is applicable to broadcast, groupcast, and unicast communication.

This solution variant addresses the relative timing difference between the time the sending UE starts using the new L2 ID in its message and the time the receiving UE starts recognizing the new L2 ID of the sending UE. In other words, this mechanism covers the following race conditions:

1) The scenario where the sending UE starts using the new L2 ID as the source address in its messages even if one or more of the receiving UE(s) still recognize the old L2 ID as the valid source L2 ID of the sending UE.

2) The scenario where the message from the sending UE arrives at the receiving UE containing the old L2 ID, while the receiving UE already recognizes the new L2 ID as the valid source L2 ID of this sending UE.

In both scenarios, without the mechanism described in this section, the receiving UE(s) discard(s) the received message due to the L2 ID in the source address of the sending UE not being valid. With this mechanism described in this section, the receiving UE(s) is/are able to receive messages from the sending UE without discarding them, thus avoiding message loss, irrespective of the relative timing difference between the sending UE switching to use the new L2 ID in messages it sends and the receiving UE(s) switching to accept the new L2 ID in the received messages.

In one example, the receiving UE(s) stop(s) accepting the old L2 ID from the sending UE as soon as the receiving UE(s) receives a message from the sending UE containing the sending UE's new L2 ID as the source ID, indicating that the sending UE has already switched to the new L2 ID, thus the receiving UE(s) will no longer receive messages containing the sending UE's old L2 ID.

In another example, the receiving UE(s) use(s) a time window in which it accepts the message from both the old and the new L2 ID from the sending UE. The definition and the usage of this time window is similar to "L2 ID update safeguard timer" described in the Embodiment 3 variant 1 above. Upon expiration of this timer, the receiving UE(s) stops accepting messages containing the sending UE's old L2 ID. As a result, the receiving UE(s) switches to the sending UE's new L2 ID only.

In case of IP-based communication, the change of the IP address and the L2 ID occurs simultaneously. In this case, the mechanism described in this variant applies to both IP address and L2 ID.

Embodiment 4: Mechanism to Salvage the UE Who Misses the L2 ID Update More than One Update Cycle Embodiment 4, Variant 1: Explicit Query The L2 ID update mechanism described in Embodiment 1, Embodiment 2, and Embodiment 3 is done by source UE communicating its old (i.e. current) L2 ID and the new L2 ID. The mechanism is to "salvage" the UE who misses the L2 ID update more than once. This update is sent to other UE(s) in the communication depending on the mode being used (broadcast, groupcast, and unicast).

It should be noted that, due to the mechanism of this L2 ID update, only two immediately successive L2 ID values are communicated. For example, L2 ID at generation "N" is followed by the next ID at generation "N+1", and these two L2 IDs are sent in the L2 ID update message.

This message scheme implies that, once the receiving UE misses one L2 ID update cycle, the next L2 update from the same UE will contain the old (i.e current) L2 ID that is unknown to the UE which missed the previous L2 ID update cycle. In this case, the UE can no longer keep track of the sequence of L2 IDs for a given UE in communication. For example, if a UE-A's L2 ID changes from ID value #1 to ID value #2 in one update cycle, and from ID value #2 to ID value #3 in next update cycle, and one of the receiving UEs has missed the first update cycle (update from ID value #1 to ID value #2) but has successfully received the next L2 ID update cycle (update from ID value #2 to ID value #3), then this UE cannot trace the sequence of ID value change from ID value #1 to ID value #3. Therefore, it cannot identify that ID value #1 and ID value #3 designates the same UE.

In general, if a receiving UE fails to receive the L2 ID update in more than 1 update cycle, it cannot establish the continuity of L2 ID change in the subsequent L2 ID update for a given UE in communication.

To mitigate from the condition described in the above section, this variant introduces a mechanism to restore the continuity of L2 ID change over time that spans more than one update cycle.

Each UE in the communication using PC5 interface defines a "default" L2 ID. This "default ID" is used as a fallback L2 ID as a way for the receiving UE(s) to re-establish the association between the source UE and its currently used (i.e. latest) L2 ID. This mechanism implies that all UEs involved with a communication "knows" this "default ID" in one way or another.

In another example, this "default" L2 ID is more permanent in nature. In this case, it is implicitly known by all UEs in communication, such as system configuration or statically assigned L2 ID value for each UE.

In another example, this "default" L2 ID can be made by a well-defined formula based on the last-known L2 ID by the receiving UE. For example, the last several bits of the L2 ID can be set as a pre-determined, well-known format (such as all "1s") to designate that it is a "default" L2 ID for a given source UE.

In this variant, an explicit request message can be sent by any legitimate UE in the already-established communication to the source UE. This request can be made by the UE sending an explicit message over PC5 interface to the UE in question to request the UE send the latest L2 ID. In other words, this variant can be summarized as a recovery method once the receiving UE loses track of the L2 ID of the sending UE. This is illustrated in FIG. 11.

Figure 11:
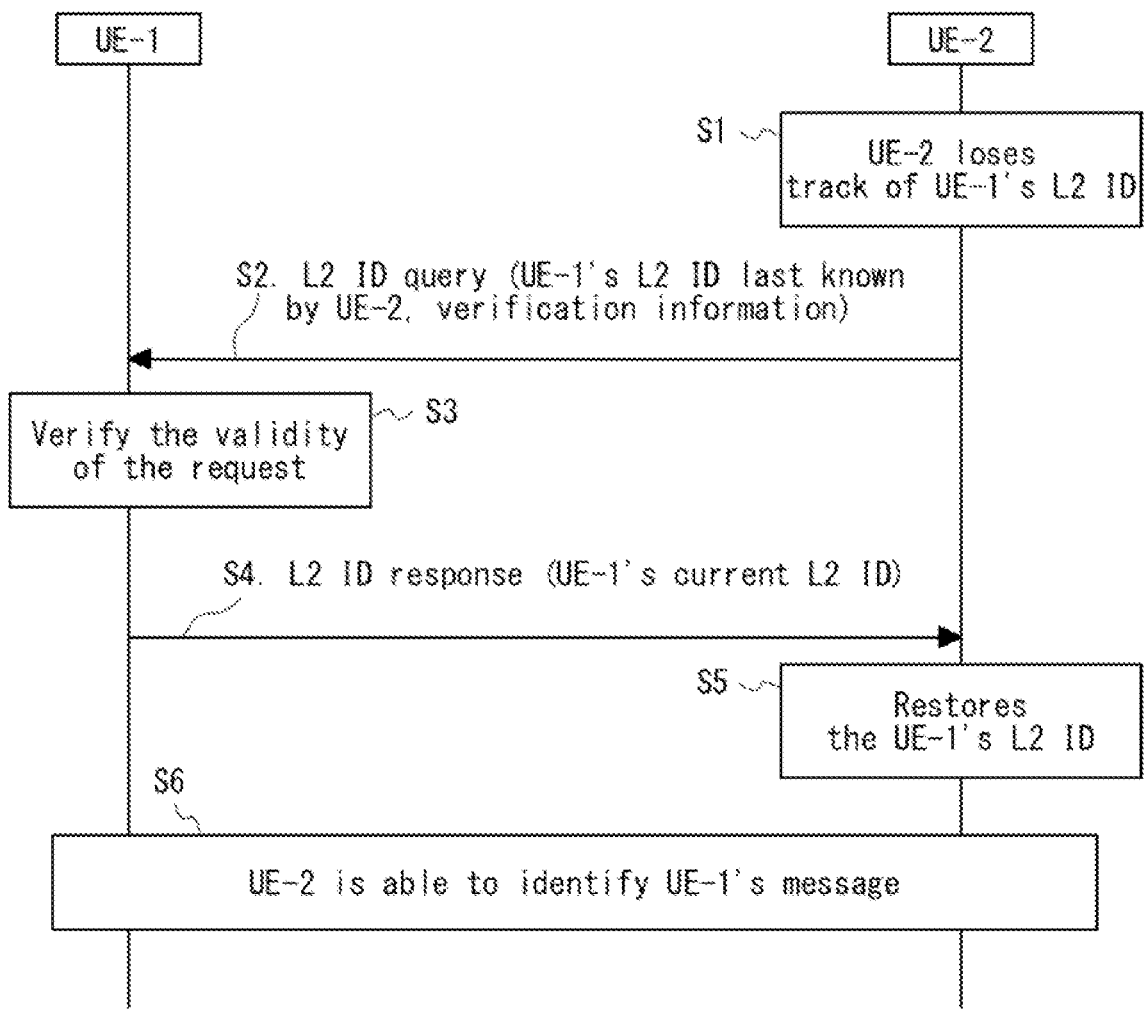
FIG. 11 is a sequence diagram illustrating a mechanism to re-establish the L2 ID.

FIG. 11 shows a mechanism to re-establish the L2 ID when a UE misses more than one cycle of L2 ID update over PC5 communication.

S1 in FIG. 11 shows that a UE-2 loses track of the L2 ID of a UE-1 by, for example, missing more than 1 cycle of L2 ID update from the UE-1.

S2 in FIG. 11 shows that the UE-2 sends L2 ID query message, for example, to the UE-1 to request the UE-1 to provide the latest L2 ID based on the UE-1's last known L2 ID that the UE-2 is aware of. This message also includes other information that identifies the requesting entity (UE-2) is a valid and legitimate a UE in the communication.

S3 in FIG. 11 shows that UE-1 verifies the validity of the request received in S2.

S4 in FIG. 11 shows that If the validity check in S3 is successful, then the UE-1 sends its latest (current) L2 ID to the UE-2.

S5 in FIG. 11 shows that the UE-2 receives the message in S4 and restores the UE-1's L2 ID.

S6 in FIG. 11 shows that the UE-2 is able to identify the message sent by the UE-1 as the source.

Embodiment 4, Variant 2: Periodic Update

In another example, the UE in question may voluntarily and periodically include the "default" L2 ID in the L2 ID update message to all receiving UEs. The mechanism is to "salvage" the UE who misses the L2 ID update more than once. To serve the purpose of re-synchronizing to the latest L2 ID of the source UE, this "default" L2 ID is relatively more persistent in time compared to the normal L2 ID which is changed periodically. In other words, this variant can be summarized as a prevention method to avoid the receiving UE to lose track of the L2 ID of the sending UE. This is illustrated in FIG. 12.

Figure 12:
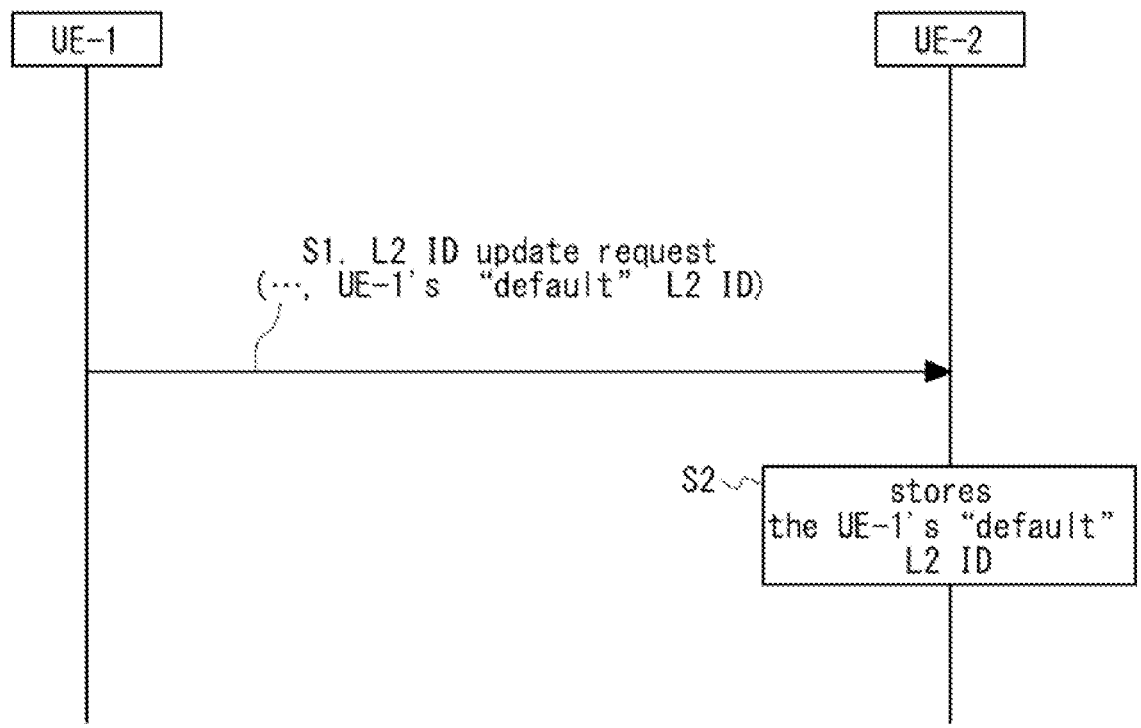
FIG. 12 is a sequence diagram illustrating a mechanism to provide the "default" L2 ID.

FIG. 12 shows a mechanism to provide the "default" L2 ID to the peer UE(s) over PC5 communication.

S1 in FIG. 12 shows that a UE-1 sends L2 ID update request message to the peer UE(s) in communication. In this message, the UE-1 includes its "default" L2 ID. It should be noted that this "default" L2 ID information is included less often than the normal "L2 ID" that is updated periodically.

S2 in FIG. 12 shows that a UE-2 stores the UE-1's "default" L2 ID.

Further Embodiments (System Overview)

Figure 13:
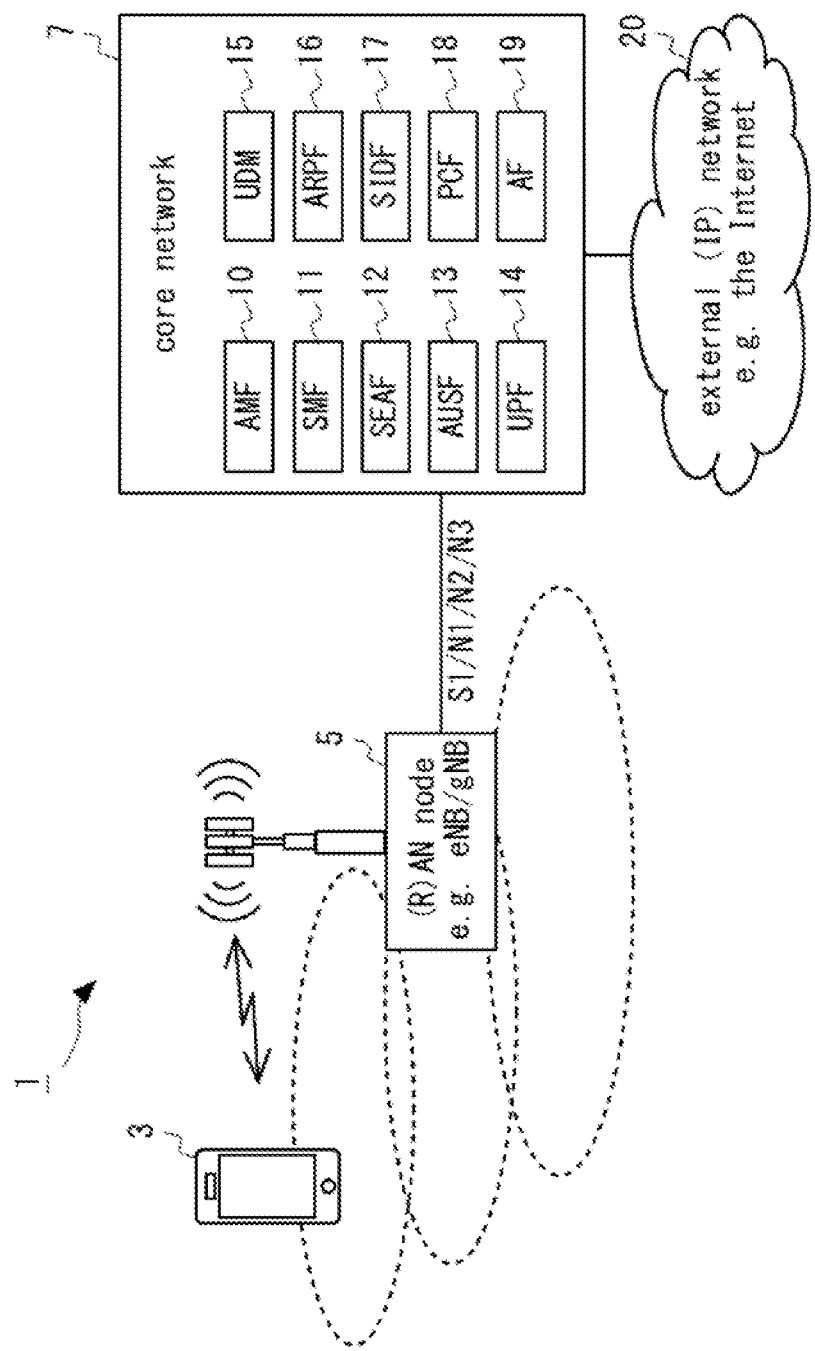
FIG. 13 is a figure illustrating a mobile telecommunication system 1.

FIG. 13 schematically illustrates a mobile (cellular or wireless) telecommunication system 1 to which the above embodiments are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 13 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example, the so-called 'Uu' interface and/or the like). Neighboring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) and user plane functions (UPFs). It will be appreciated that the core network 7 may also include, amongst others: an Access and Mobility Management Function (AMF) 10, a Session Management Function (SMF) 11, a Security Anchor Functionality (SEAF) 12, an Authentication Server Function (AUSF) 13, a Unified Data Management (UDM) function 15, an Authentication credential Repository and Processing Function (ARPF) 16, a Subscription Identifier De-concealing Function (SIDF) 17, a Policy Control Function (PCF) 18, and an Application Function (AF) 19.

From the core network 7, connection to an external IP network 20 (such as the Internet) is also provided. The components of this system 1 are configured to perform one or more of the above described exemplary embodiments.

(User Equipment (UE))

Figure 14:
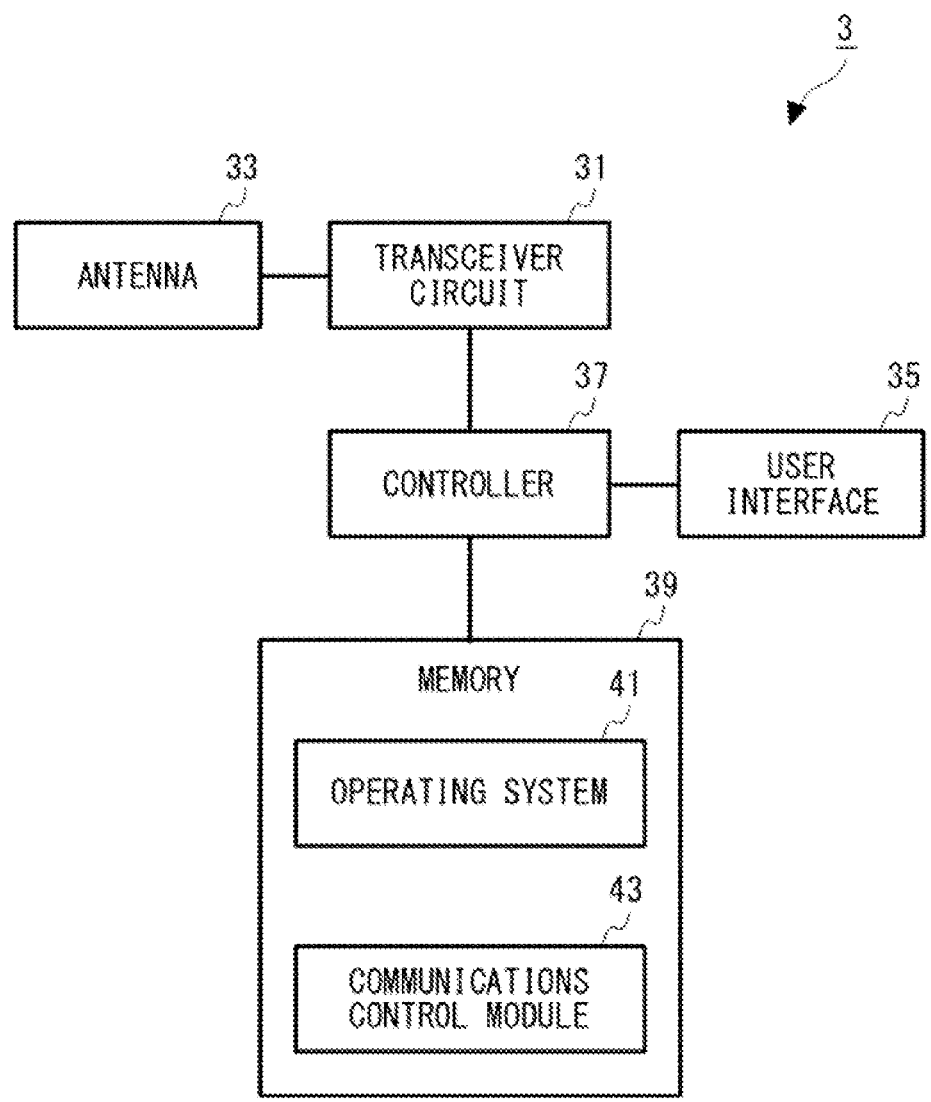
FIG. 14 is a block diagram illustrating main components of the UE 3.

FIG. 14 is a block diagram illustrating the main components of the UE 3 shown in FIG. 13. As shown in FIG. 14, the UE 3 includes a transceiver circuit 31 which is operable to transmit signals to and to receive signals from the connected node(s) via one or more antennas 33. Although not shown in FIG. 14, the UE 3 will of course have all the usual functionality of a conventional mobile device (such as a user interface 35) and this may be provided by any one or any combination of hardware, software and firmware, as appropriate. Software may be pre-installed in memory and/or may be downloaded, for example, via the telecommunication network or from a removable data storage device (RMD).

A controller 37 controls the operation of the UE 3 in accordance with software stored in a memory 39. The controller 37 may be realized by, for example, one or more CPU(s) (Central Processing Unit(s)). Furthermore, the controller 37 can perform processes performed by the UE 3 explained with reference to the sequence diagrams and the flowcharts in the above-described embodiments by loading software (a computer program) from the memory 39 and executing the loaded software.

The memory 39 is formed by a combination of a volatile memory and a nonvolatile memory. The memory 39 may include a storage disposed apart from the controller 37. In this case, the controller 37 may access the memory 39 through an I/O interface (not shown). The software stored in the memory 39 includes a group of instructions to cause a computer to perform an algorithm explained above with reference to the drawings.

The software includes, among other things, an operating system 41 and a communications control module 43 having at least a transceiver control module. The communications control module 43 (using its transceiver control sub-module) is responsible for handling (generating/sending/receiving) signaling and uplink/downlink data packets between the UE 3 and other nodes, such as the base station/(R)AN node 5, an MME, the AMF 10 (and other core network nodes).

Such signaling may include, for example, appropriately formatted signaling messages relating to connection establishment and maintenance (e.g. RRC messages), NAS messages such as periodic location update related messages (e.g. tracking area update, paging area updates, location area update) etc.

((R)AN Node)

Figure 15:
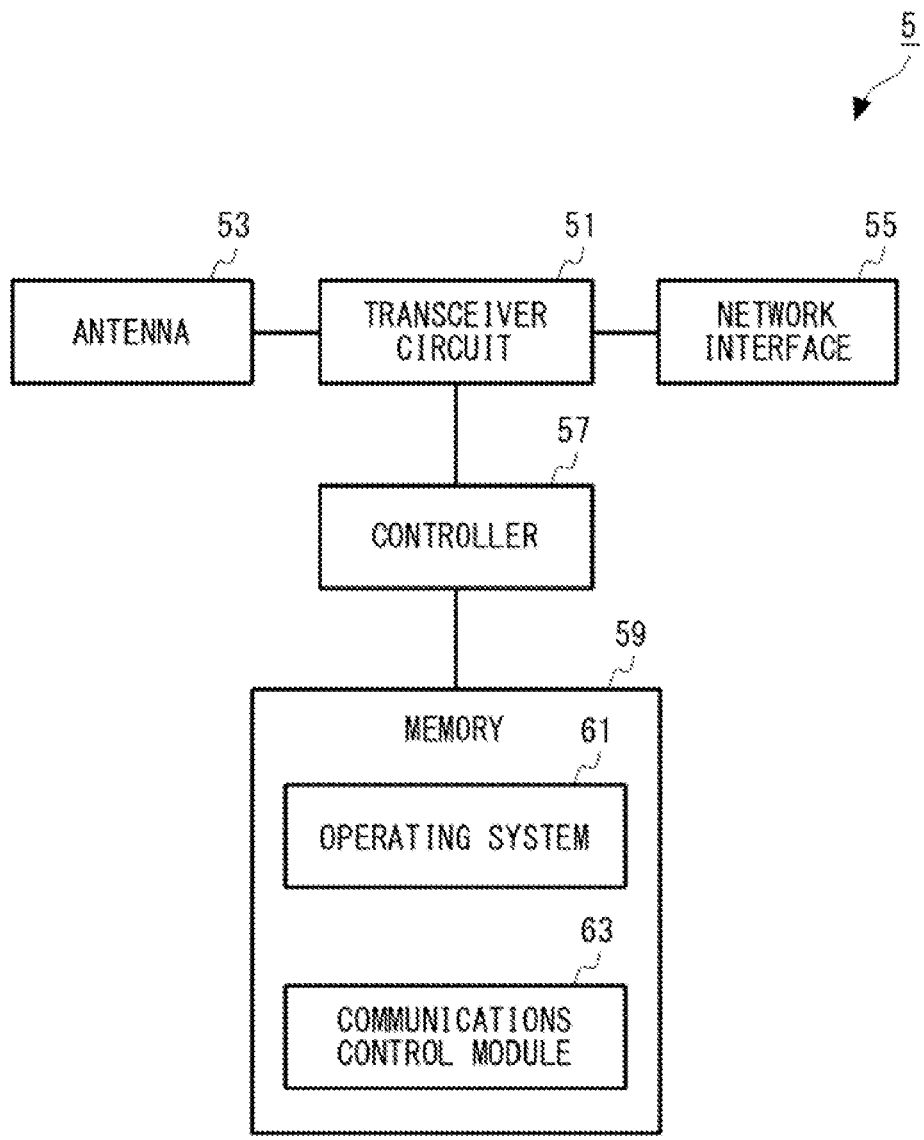
FIG. 15 is a block diagram illustrating main components of an exemplary (R)AN node 5.

FIG. 15 is a block diagram illustrating the main components of an exemplary (R)AN node 5 shown in FIG. 13, for example a base station ('eNB' in LTE, 'gNB' or 'ngNB' in 5G). As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. A controller 57 controls the operation of the (R)AN node 5 in accordance with software stored in a memory 59. The controller 57 may be realized by, for example, one or more CPU (s). Furthermore, the controller 57 can perform processes performed by the core network node by loading software (a computer program) from the memory 59 and executing the loaded software. The software may be pre-installed in the memory 59 and/or may be downloaded via the telecommunication network or from a removable data storage device (RMD), for example.

The memory 59 is formed by a combination of a volatile memory and a nonvolatile memory. The memory 59 may include a storage disposed apart from the controller 57. In this case, the controller 57 may access the memory 59 through an I/O interface (not shown). The software stored in the memory 59 includes a group of instructions to cause a computer to perform an algorithm.

The software includes, among other things, an operating system 61 and a communications control module 63 having at least a transceiver control module. The communications control module 63 (using its transceiver control sub-module) is responsible for handling (generating/sending/receiving) signaling between the (R)AN node 5 and other nodes, such as the UE 3, the MME, the AMF 10 (e.g. directly or indirectly). The signaling may include, for example, appropriately formatted signaling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signaling may also include, for example, broadcast information (e.g. Master Information and System information) in a sending case.

The controller is also configured (by software or hardware) to handle related tasks such as, when implemented, UE mobility estimate and/or moving trajectory estimation.

(Core Network Node)

Figure 16:
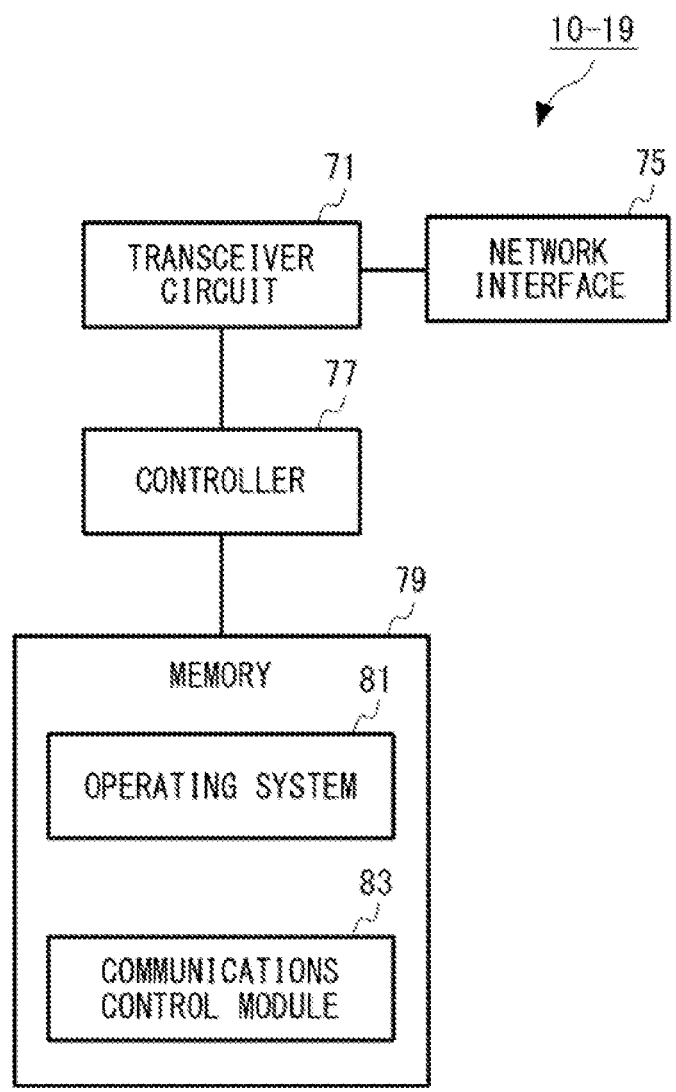
FIG. 16 is a block diagram illustrating main components of an exemplary core network node.

FIG. 16 is a block diagram illustrating the main components of an exemplary core network node shown in FIG. 13, for example an AMF 10, a SMF 11, a SEAF 12, an AUSF 13, an UPF 14, an UDM 15, an ARPF 16, a SIDF 17, a PCF 18, an AF 19, etc. The core network node is included in the 5GC. As shown, the core network node includes a transceiver circuit 71 which is operable to transmit signals to and to receive signals from other nodes (including the UE 3) via a network interface 75. A controller 77 controls the operation of the core network node in accordance with software stored in a memory 79. The controller 77 may be realized by, for example, one or more CPU(s). Furthermore, the controller 77 can perform processes performed by the core network node by loading software (a computer program) from the memory 79 and executing the loaded software. The software may be pre-installed in the memory 79 and/or may be downloaded via the telecommunication network or from a removable data storage device (RMD), for example. The software includes, among other things, an operating system 81 and a communications control module 83 having at least a transceiver control module.

The memory 79 is formed by a combination of a volatile memory and a nonvolatile memory. The memory 79 may include a storage disposed apart from the controller 77. In this case, the controller 77 may access the memory 79 through an I/O interface (not shown). The software stored in the memory 79 includes a group of instructions to cause a computer to perform an algorithm.

The communications control module 83 (using its transceiver control sub-module) is responsible for handling (generating/sending/receiving) signaling between the core network node and other nodes, such as the UE 3, base station/(R)AN node 5 (e.g. "gNB" or "eNB") (directly or indirectly). Such signaling may include, for example, appropriately formatted signaling messages relating to the procedures described herein, for example, NG AP message (i.e. a message by N2 reference point) to convey an NAS message from and to the UE, etc.

The AMF 10 provides UE-based authentication, authorization and mobility management services. It offers services to the Session Management Function. It also provides services to other AMFs, Policy Control Functions 18, Short Message Service Function, Location Management Function, Gateway Mobile Location Centre and NEF via the Name of service-based interface. Some of the key AMF services include registration, connection, reachability and mobility management. It also serves as termination points for RAN control-plane interface (N2).

The SMF 11 handles management of UE sessions while also allocating IP addresses to UEs 3. It also selects and controls the UPF 14 for data transfer. Per-session SMFs may be allocated to UEs with multiple sessions. It also interacts with the User Plane Function 14 for efficient routing of the user's packets.

The SEAF 12 creates a unified anchor key KSEAF (common for all accesses) that can be used by the UE 3 and the serving network to protect the subsequent communication for the primary authentication. It is possible that there are two anchor keys for the scenario when a UE 3 is connected to 3GPP access (visited network) and to a non-3GPP access (home network).

The AUSF 13 component handles authentication requests for 3GPP access and non-3GPP access networks. It interacts with the Security Anchor Function 12 in order to authenticate the User Equipment 3. The set of values in the Universal Subscriber Identification Module are used by the Authentication Credential Repository and Processing Function. The subscription identifier is used to uniquely identify a subscription and to mutually authenticate the UE 3 and the 5G core network 7. The AUSF 13 serves as the termination point of user plane security, while providing the necessary authentication and authorization processes. It also handles network slicing security and Enhanced International Mobile Subscriber Identity Privacy.

The UPF 14 supports packet routing and forwarding, packet inspection, and QoS handling. It also acts as an external PDU session point of interconnection to Data Network, and is an anchor point for intra-RAT and inter-RAT mobility. This is one of the important functions and has to efficiently process packets within sub-milliseconds. Any slowdown in this function will significantly increase packet latency and reduce user's quality-of-experience. The UPF 14 utilizes the services of the Session Management Function 11.

The UDM 15 offers services to AMF 10, SMF 11, SMSF, NEF and AUSF 13. The services include Subscription data storage, Context data management service Authentication service in collaboration with AUSF 13. The subscription data management is used by NFs (AMF 10 and SMF 11) to retrieve the UE's subscription data relevant to the consumer NF from the UDM 15. It is also used by consumer NFs to subscribe or un-subscribe to notifications of data change. The UDM 15 offers consumer NFs (AMF 10, SMF 11, SMSF) that have previously subscribed, to get notified by means of the notification service operation when the UDM 15 decides to modify the subscribed data.

The ARPF 16 (normally collocated with the UDM 15) stores the long-term security credentials like the key K in EPS AKA or EAP-AKA for authentication. It can run cryptographic algorithms using the long-term security credentials as input and can create the authentication vectors.

The PCF 18 governs the network behavior by supporting unified policy framework. It also provides policy rules to Control Plane function(s). For instance, it provides Access and Mobility Management related policies for the AMF 10; and UE policies for Access Network discovery and selection policies and UE Route Selection Policies.

The AF 19 enables application influence on traffic routing, accessing NEF, interaction with policy framework for policy control. This function will have significant trust and security implications since the core functions are exposed to the application level.

The NEF enables external exposure capabilities of network functions for supporting Monitoring, Provisioning and Policy/Charging. The network capability exposure comprises:
(i) Exposure of network events externally as well as internally towards core network NFs; (ii) Exposure of provisioning capability towards external functions; (iii) Exposure of policy and charging capabilities towards external functions; and (iv) Exposure of core network internal capabilities for analytics.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

(Modifications and Alternatives)

Detailed embodiments have been described above. As those skilled in the art will appreciate, a number of modifications and alternatives can be made to the above embodiments whilst still benefiting from the disclosure embodied therein. By way of illustration only a number of these alternatives and modifications will now be described.

The embodiments in this disclosure describe the Layer 2 Identity (L2 ID) update procedure. The general concept of identity update is also applicable to an equivalent functionality at another communication layer, for example, an IP address update functionality at the IP layer. In case the L2 ID update and IP address update are synchronized within the UE in such a way that these ID changes occur simultaneously at two different layers, then the procedures described in this disclosure may be applied at different layers to achieve similar result.

The message names and parameter names used in the above described embodiments represent the intended functionalities and information elements. These message names and parameter names are used only as examples in order to describe specific exemplary embodiments. However, it will be appreciated that different message names and parameter names may be used in different implementations. It will also be appreciated that in relevant standard specifications, such as 3GPP TS or TR documents, similar or different names may be used to represent the same functions or information as the messages and parameters described above.

The User Equipment (or "UE", "mobile station", "mobile device" or "wireless device") in the present disclosure is an entity connected to a network via a wireless interface. It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine type communication applications.

TABLE 2

Some examples of machine type communication applications.

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |

TABLE 2-continued

Some examples of machine type communication applications.

| Service Area | MTC applications |
|---|---|
| Health | Monitoring vital signs |
| | Supporting the aged or handicapped |
| | Web Access Telemedicine points |
| | Remote diagnostics |
| Remote Maintenance/ | Sensors |
| Control | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch exchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

In the above description, the UE, the (R)AN node, and the core network node are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); micro processing units (MPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The mechanisms presented in this disclosure involves message exchanges among UEs having specific information elements. In some cases, UEs can do D2D or direct communications. Therefore, it is possible to detect infringement by monitoring the communication in UEs.

The above embodiments are also applicable to 'non-mobile' or generally stationary user equipment.

(Summary of the Methods)

The above aspects describe exemplary methods comprise the following steps:

Embodiment 1, Variant 1

1) The sending UE sends the new L2 ID and the verification info to the receiving UE(s).
2) The receiving UE(s) validates the validity and authenticity of the sending UE using the verification information and determine whether to accept the new L2 ID or not.

Embodiment 1, Variant 2

1) The sending UE inputs the set of input parameters to the KDF to derive the new L2 ID and the MAC (hash value).
2) The receiving UE(s) inputs the same set of input parameters to the KDF to derive the MAC (hash value), and compares the MAC with the one received from the sender UE.

Embodiment 1, Variant 3

1) The sending UE inputs the sequence number in addition to the set of input parameters to the KDF to derive the new L2 ID and the MAC (hash value).
2) The receiving UE(s) inputs the sequence number in addition to the same set of input parameters to the KDF to derive the MAC (hash value), and compares the MAC with the one received from the sender UE.

Embodiment 1, Variant 4

1) The sending UE sends the new L2 ID and the verification info to the receiving UE(s), and start using the new L2 ID in communication, assuming all receiving UE(s) has received it and verified it successfully.

Embodiment 1, Variant 5

1) The sending UE sends the new L2 ID and the verification info to the receiving UE(s).
2) The receiving UE(s) validates the validity and authenticity of the sending UE using the verification information and determine whether to accept the new L2 ID or not.

3) The receiving UE(s) returns the L2 ID update response message to the sending UE to indicate success or failure of the validation.

Embodiment 1, Variant 6

1) The UEs in the communication exchanges the supported KDF functions to derive the new L2 ID and the MAC (hash value) at the time of communication establishment.
2) The UEs in the communication agree on the KDF function used.

Embodiment 1, Variant 7

1) The UEs in the communication exchanges the supported parameters to the KDF functions to derive the new L2 ID and the MAC (hash value) at the time of communication establishment.
2) The UEs in the communication agree on the parameters to the KDF function used.

Embodiment 2, Variant 1

1) (sub-variant 1) Upon sending the L2 ID update message, the sending UE repeats the same message multiple times.
2) (sub-variant 2) When one or more of the receiving UE(s) receives the L2 ID update message from the sending UE, this receiving UE(s) relays the same message.
3) (sub-variant 3) When one or more of the receiving UE(s) receives the L2 ID update message from the sending UE, this receiving UE(s) floods the same message.
4) (sub-variant 4) Upon sending the L2 ID update message, the sending UE repeats the same message multiple times, and/or one or more of the receiving UE(s) relays or floods the same message.

Embodiment 2, Variant 2

1) Upon sending the L2 ID update message, the sending UE inserts a unique one-time-only value (e.g. sequence number) into the messages.
2) The receiving UE(s) uses the receives unique one-time-only value (e.g. sequence number) to determine whether the received message is an original or a replayed message.

Embodiment 3, Variant 1

1) When the sending UE updates the L2 ID, the sending UE repeats the application layer messages multiple times using both the old and the new L2 ID.
2) The receiving UE(s) accepts the received application layer messages using either the old or the new L2 ID as the source L2 ID in the message.

Embodiment 3, Variant 2

1) When the receiving UE receives the application layer messages from the sending UE, the receiving UE accepts the message containing either the old or the new L2 ID as the source field in the received message during the period the L2 ID update occurs.

Embodiment 4, Variant 1

1) The receiving UE that lost track of the L2 ID of a sending UE, the receiving UE requests the sending UE to send the L2 ID information.
2) The sending UE responds to the request from the receiving UE, and sends the L2 ID information.
3) The receiving UE re-establishes the sending UE's L2 ID.

Embodiment 4, Variant 2

1) The sending UE periodically inserts the "default" L2 ID in the L2 ID update message to the receiving UE(s).
2) The receiving UE(s) stores the received "default" L2 ID.
3) If the received UE loses track of the L2 ID change of the sending UE, the receiving UE uses the "default L2 ID" to identify the sending UE.

Functionalities of the Embodiments in the Disclosure

Beneficially, the above described embodiments include, although they are not limited to, one or more of the following functionalities:

Embodiment 1, Variant 1 a) Upon updating its own L2 ID, the sending UE sends L2 ID update request message to the receiving UE(s) containing the new L2 ID and additional information so that the receiving UE(s) can verify the validity and authenticity of the message and the sending UE.
b) Upon receiving the L2 ID update message from the sending UE, the receiving UE(s) verify(ies) the validity and authenticity of the received L2 ID update message using the additional information in the message upon determining whether to accept the new L2 ID or not.

Embodiment 1, Variant 2 a) This additional information in the L2 ID update message in embodiment 1 variant 1 represents one or more information elements that uniquely identify the sending UE and the communication context, such as UE specific or communication context specific information that are relevant to the sending and receiving UEs.
b) In addition to the new L2 ID, the L2 ID update message includes the MAC (hash value) of these information elements that uniquely represents the sending UE and the communication context mentioned above.
c) Upon creating the new L2 ID and the MAC (hash value), the sending UE uses a set of one or more information elements as input parameters to the KDF function upon deriving the new L2 ID and the MAC (hash value) mentioned above. This guarantees that the new L2 ID and the MAC (hash value) reflects information that uniquely identify the sending UE and the communication context.

Embodiment 1, Variant 3 a) In addition to Embodiment 1, variant 2, the sending UE includes a sequence number to the KDF function to generate the new L2 ID and the MAC (hash value).
b) The sequence number is specific to one L2 ID update message. Thus, it prevents type of attach such as a Man-in-the-middle replay attack.
c) The sequence number is updated in each subsequent L2 ID update message from the sending UE so that the same sequence number value is used only once.

Embodiment 1, Variant 4 a) The sending UE sends L2 ID update message to the receiving UE(s).

b) The receiving UE(s) verifies the validity and authenticity of the received message based on the description in Embodiment 1, variant 1 or variant 2 upon determining whether to accept the new L2 ID value from the sending UE or not.

Embodiment 1, Variant 5 a) In addition to Embodiment 1 variant 3, upon receiving the L2 ID update message from the sending UE, the receiving UE(s) returns the response message (L2 ID update response) to the sending UE to indicate whether the receiving UE(s) accepts the new L2 ID or not based on the verification and authentication check.

b) Upon receiving this response message from the receiving UE(s), the sending UE checks individual UE's acknowledgement from each receiving UE. Based on this result, the sending UE takes corrective action, if necessary.

Embodiment 1, Variant 6 a) The UEs in the communication exchange one or more of their supported KDF algorithm(s) upon establishing communication.

b) Based on the exchanged information, the UEs determine and agree on the KDF algorithm used in deriving new L2 ID and MAC (hash value) that is sent in the L2 ID update message.

Embodiment 1, Variant 7 a) The UEs in the communication exchange one or more of their supported input parameters to the KDF function that derives the new L2 ID and the MAC (hash value).

b) Based on the exchanged information, the UEs determine and agree on the set of input parameters for the KDF function.

Embodiment 2, Variant 1 a) In order to maximize the chance of L2 ID update message to be received by all UEs in the communication, mechanism in one or more of the following sub-variants is used.

(Sub-variant 1) The sending UE repeats the L2 ID update message multiple times.

(Sub-variant 2) One or more of the receiving UE(s) relays the L2 ID update message received from the sending UE.

(Sub-variant 3) One or more of the receiving UE(s) floods the L2 ID update message received from the sending UE.

(Sub-variant 4) The sending UE repeats, and/or one or more of the receiving UE(s) relays/floods the L2 ID update message received from the sending UE.

Embodiment 2, Variant 2 a) In addition to Embodiment 2 variant 1, the sending UE includes unique information (e.g. sequence number) that is used only once in the L2 ID update message to prevent the replay attack.

b) The receiving UE(s) checks the uniqueness of the unique information (sequence number) and determine whether the received L2 ID update message is an original or a replay of previous message.

Embodiment 3, Variant 1 a) During the period when the L2 ID update takes place, the sending UE sends the same application layer message multiple times to the receiving UE(s), using both old and new L2 ID in the source L2 ID field.

b) The receiving UE(s) accepts the received application layer message from the sending UE irrespective of whether the individual receiving UE still recognizes the old L2 ID or the new L2 ID as the valid L2 ID of the sending UE.

Embodiment 3, Variant 2 a) During the period when the L2 ID update takes place, the receiving UE accepts the messages from the sending UE containing either the old or the new L2 ID in the source L2 ID field.

Embodiment 4, Variant 1 a) The receiving UE that loses track of the change of L2 ID of the sending UE over the course of time (e.g. the receiving UE misses the L2 ID update message from the sending UE in more than 1 update cycle), the receiving UE requests the sending UE to indicate the mapping between the sending UE and its latest L2 ID.

b) Using the receiving information from the sending UE, the receiving UE re-establishes the correlation between the sending UE and its latest L2 ID.

Embodiment 4, Variant 2 a) The sending UE periodically inserts the "default" L2 ID in the L2 ID update message to the receiving UE(s).

b) The receiving UE(s) identifies this "default" L2 ID as the fallback L2 ID of the sending UE if the receiving UE loses track of the change of L2 ID of the sending UE over the course of time (e.g. the receiving UE misses the L2 ID update message from the sending UE in more than 1 update cycle).

c) If the receiving UE(s) loses track of the change of L2 ID of the sending UE over the course of time, the receiving UE uses the "default" L2 ID to identify the sending UE.

(Advantages of the Disclosure in Contrast to Current State of the Art)

Embodiment 1

The L2 ID update procedure provides a method for the receiving UE(s) to be able to verify the received message and authenticity of the sending UE.

This validation and authenticity check mechanism prevents malicious UE from sending fake L2 ID update message to potentially cause the receiving UEs' L2 ID mapping information of the sending UE.

The validation information in the L2 ID update procedure uniquely identifies and validates the sending UE and the new L2 ID using the MAC (hash value).

The L2 ID update procedure provides an option for the sending UE to verify the receiving UEs' acceptance or rejection of the L2 ID update message.

The KDF negotiation mechanism provides a method for various UE implementations with multiple different KDF function implementations to negotiate and agree on a single KDF function.

The KDF negotiation mechanism provides a method for various UE implementations with multiple different input parameters to negotiate and agree on the same set of input parameters.

Embodiment 2

The methods improve the chance of successful reception of L2 ID update message by all UE(s) in the communication by using one or more of the mechanisms for all UE(s) to be able to receive multiple copies of the same L2 ID update message.

The method uses a unique one-time-only parameter in the L2 ID update message, which allows the receiving UE(s) to identify whether the received message is an original or duplicate, therefore prevents the replay attack.

Embodiment 3

The chance of successful reception of application layer message flow is improved by either: 1) duplicating the messages using both old and new L2 IDs, or 2) accepting either old or new L2 ID, during the period when the periodic L2 ID update event occurs simultaneously.

Embodiment 4

The methods provide mechanisms for the receiving UE to re-establish the L2 ID change of a sending UE if a receiving UE in the communication misses more than 1 cycle of L2 ID update.

Part of or all the foregoing embodiments can be described as in the following appendixes, but the present disclosure is not limited thereto.

(Supplementary Note 1)

a first UE (User Equipment) sending a message including L2 ID (Layer 2 Identity) and verification information; and a second UE(s) receiving the message from the first UE and determining whether to accept the L2 ID or not using the verification information.

(Supplementary Note 2)

The communication system according to Supplementary Note 1, wherein the first UE generates the L2 ID and a first MAC (Message Authentication Code) using KDF (Key Derivation Function) and sends the message additionally including the first MAC; and the second UE(s) generates a second MAC using KDF and compares the first MAC with the second MAC to determine whether to accept the L2 ID or not.

(Supplementary Note 3)

The communication system according to Supplementary Note 2, wherein the first UE uses a sequence number to generate the L2 ID and the first MAC using KDF; and the second UE(s) uses sequence number to generate the second MAC using KDF and compares the first MAC with the second MAC to determine whether to accept the L2 ID or not.

(Supplementary Note 4)

The communication system according to any one of Supplementary Notes 1 to 3, wherein the first UE uses the L2 ID in communication after it sends the L2 ID to the second UE(s).

(Supplementary Note 5)

The communication system according to any one of Supplementary Notes 1 to 4, wherein the second UE(s) sends a response message to the first UE to indicate the determination result of the second UE(s).

(Supplementary Note 6)

The communication system according to Supplementary Note 2 or 3, wherein the first UE and the second UE(s) exchange one or more KDF function(s) to generate the L2 ID and the first MAC for the first UE and to generate the L2 ID and the second MAC for the second UE(s).

(Supplementary Note 7)

The communication system according to any one of Supplementary Notes 2, 3 or 6, wherein the first UE and the second UE(s) exchange parameters to generate the L2 ID and the first MAC for the first UE and to generate the L2 ID and the second MAC for the second UE(s).

(Supplementary Note 8)

The communication system according to any one of Supplementary Notes 1 to 7, wherein the first UE sends the message multiple times.

(Supplementary Note 9)

The communication system according to any one of Supplementary Notes 1 to 8, wherein when the second UE(s) receives the message from the first UE, the second UE(s) relays or floods the message.

(Supplementary Note 10)

The communication system according to Supplementary Note 8, wherein the first UE inserts different values into the messages, respectively; and the second UE(s) uses the different values to determine whether the message received by the second UE(s) is the first or a replayed message.

(Supplementary Note 11)

The communication system according to any one of Supplementary Notes 1 to 10, wherein the first UE sends the message multiple times using an old L2 ID and a new L2 ID when the first UE updates the old L2 ID to the new L2 ID; and the second UE(s) accepts the message using either the old or the new L2 ID in the message.

(Supplementary Note 12)

The communication system according to Supplementary Note 11, wherein, when the second UE receives the message from the first UE, the second UE accepts the message including either the old or the new L2 ID as the source L2 ID in the received message.

(Supplementary Note 13)

The communication system according to any one of Supplementary Notes 1 to 12, wherein the second UE(s) requests the first UE to send the L2 ID when the second UE(s) loses track of the L2 ID of the first UE; and the first UE sends the L2 ID to the second UE(s) in response to the request from the second UE(s); and the second UE(s) re-establishes the L2 ID of the first UE.

(Supplementary Note 14)

The communication system according to any one of Supplementary Notes 1 to 13, wherein the first UE periodically inserts a default L2 ID into the second UE(s);

the second UE(s) receives and stores the default L2 ID; and when the second UE(s) loses track of the L2 ID of the first UE, the second UE(s) uses the default L2 ID to identify the first UE.

(Supplementary Note 15)

UE (User Equipment) comprising:

a sending means for sending a message including L2 ID and verification information to another UE(s); and wherein the verification information allows another UE(s) to determine whether to accept the new L2 ID or not.

(Supplementary Note 16)

The UE according to Supplementary Note 15, wherein the UE further comprises a generating means for generating the L2 ID and MAC (Message Authentication Code) using KDF (Key Derivation Function); and the sending means sends the message additionally including the MAC.

(Supplementary Note 17)

UE (User Equipment) comprising:

a receiving means for receiving a message including L2 ID and verification information from another UE(s); and a determining means for determining whether to accept the L2 ID or not using the verification information.

(Supplementary Note 18)

The UE according to Supplementary Note 17, wherein the message additionally including the first MAC (Message Authentication Code) and the L2 ID and the first MAC are generated using KDF (Key Derivation Function); and wherein the UE further comprises a generating means for generating the second MAC using KDF, and the determining means compares the first MAC with the second MAC to determine whether to accept the L2 ID or not.

(Supplementary Note 19)

A communication method comprising:

sending a message including L2 ID and verification information to UE(s); and wherein the verification information allows the UE(s) to determine whether to accept the new L2 ID or not.

(Supplementary Note 20)

A communication method comprising:

receiving a message including L2 ID and verification information from UE(s); and determining whether to accept the L2 ID or not using the verification information.

(Supplementary Note 21)

A non-transitory computer readable medium storing a program for causing a computer to:

send a message including L2 ID and verification information to UE(s); and wherein the verification information allows the UE(s) to determine whether to accept the new L2 ID or not.

(Supplementary Note 22)

A non-transitory computer readable medium storing a program for causing a computer to:

receive a message including L2 ID and verification information from UE(s); and determines whether to accept the L2 ID or not using the verification information.

It will be appreciated by a person skilled in the art that numerous variations and/or modifications may be made to the present disclosure as shown in the specific embodiments without departing from the spirit or scope of this disclosure as broadly described. The present embodiments are, therefore, to be considered in all respects to be illustrative and not restrictive.

This application is based upon and claims the benefit of priority from Indian patent application No. 201911033136, filed on Aug. 16, 2019, and Indian patent application No. 201911043095, filed on Oct. 23, 2019, the disclosures of which are incorporated herein in its entirety by reference.

REFERENCE SIGNS LIST 1 telecommunication system
3 mobile device
5 base station
7 core network
20 external network
31 transceiver circuit
33 antenna
35 user interface
37 controller
39 memory
41 operating system
43 communications control module
51 transceiver circuit
53 antenna
55 network interface
57 controller
59 memory
61 operating system
63 communications control module
71 transceiver circuit
75 network interface
77 controller
79 memory
81 operating system
83 communications control module
100 communication system
110 UE
111 sending unit
120 UE
121 receiving unit
122 determining unit

What is claimed is:

1. A User Equipment (UE) comprising:

a controller; and a transceiver, wherein the controller is configured to control the transceiver to:

in a link identifier (ID) update procedure over an interface between the UE and another UE, send, to the another UE, an ID update request message comprising:

a new Layer 2 Identifier (L2 ID);

new security information; and a sequence number; and increment the sequence number for each sending of the ID update request message.

2. A communication method of a User Equipment (UE), the communication method comprising:

in a link identifier (ID) update procedure over an interface between the UE and another UE, sending, to the another UE, an ID update request message comprising:

a new Layer 2 Identifier (L2 ID);

new security information; and a sequence number; and incrementing the sequence number for each sending of the ID update request message.

3. The UE according to claim 1, wherein the controller is further configured to control the transceiver to:
  receive a response message from the another UE if the another UE determines that ID update request message related information is valid.

4. The communication method according to claim 2, the communication method further comprising:
  receiving a response message from the another UE if the another UE determines that ID update request message related information is valid.

5. The UE according to claim 1, wherein the controller is further configured to control the transceiver to:
  retransmit, to the another UE, the ID update request message using a timer in the UE.

6. The communication method according to claim 2, the communication method further comprising:
  retransmitting, to the another UE, the ID update request message using a timer in the UE.

7. The UE according to claim 1, wherein the controller is further configured to control the transceiver to:
  generate the new L2 ID.

8. The UE according to claim 1, wherein the controller is further configured to control the transceiver to:
  assign the new security information.

9. The communication method according to claim 2, the communication method further comprising:
  generating the new L2 ID.

10. The communication method according to claim 2, the communication method further comprising:
  assigning the new security information.

\* \* \* \* \*